United States Patent
Horn et al.

(10) Patent No.: US 11,956,171 B2
(45) Date of Patent: Apr. 9, 2024

(54) CYCLIC SHIFT REPORTING FOR A REFERENCE SIGNAL

(71) Applicant: QUALCOMM Incorporated, San Diego, CA (US)

(72) Inventors: Idan Michael Horn, Hod Hasharon (IL); Shay Landis, Hod Hasharon (IL); Valeri Sokolovski, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/545,735

(22) Filed: Dec. 8, 2021

(65) Prior Publication Data

US 2023/0179352 A1    Jun. 8, 2023

(51) Int. Cl.
*H04L 5/00* (2006.01)
*H04L 27/26* (2006.01)

(52) U.S. Cl.
CPC ........ *H04L 5/0048* (2013.01); *H04L 27/2605* (2013.01)

(58) Field of Classification Search
CPC ............................. H04L 5/0048; H04L 27/2605
See application file for complete search history.

(56) References Cited

U.S. PATENT DOCUMENTS

| | | | | |
|---|---|---|---|---|
| 9,270,356 B2 * | 2/2016 | Chung | ................. | H04B 7/0684 |
| 9,306,651 B2 * | 4/2016 | Chung | ................. | H04W 72/20 |
| 2008/0051125 A1 * | 2/2008 | Muharemovic | ..... | H04W 72/542 |
| | | | | 455/519 |

(Continued)

FOREIGN PATENT DOCUMENTS

| | | | | |
|---|---|---|---|---|
| CN | 102362441 A | * | 2/2012 | ........... H04B 7/0684 |
| CN | 104737484 A | * | 6/2015 | ............. F01D 5/025 |

(Continued)

OTHER PUBLICATIONS

Ericsson: "PRS with Cyclic Shifts", 3GPP TSG-RAN WG1 Meeting #103-e, R1-2008766, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 16, 2020, XP051939651, pp. 1-6, section 2.1.

(Continued)

*Primary Examiner* — Shean Tokuta
(74) *Attorney, Agent, or Firm* — Holland & Hart LLP

(57) ABSTRACT

Methods, systems, and devices for wireless communications are described. In some wireless communications systems, a user equipment (UE) may transmit, to a network entity, a capability message indicating a capability of the UE to report a cyclic shift for a reference signal. The UE may receive an indication of a reporting configuration from the network entity indicating uplink resources for reporting the cyclic shift by the UE, and the UE may receive one or more reference signals from the network entity. In some examples, the UE may transmit, to the network entity and using the uplink resources, an uplink message indicating the cyclic shift. The UE may estimate the cyclic shift based on measuring a channel delay spread of the one or more reference signals, a phase noise mask of the one or more reference signals, or both.

30 Claims, 18 Drawing Sheets

(56) References Cited

U.S. PATENT DOCUMENTS

| | | | |
|---|---|---|---|
| 2008/0139237 A1* | 6/2008 | Papasakellariou | H04L 5/0048 455/517 |
| 2008/0168114 A1* | 7/2008 | Han | H04L 1/0023 708/209 |
| 2009/0129259 A1* | 5/2009 | Malladi | H04J 11/00 370/280 |
| 2012/0014349 A1* | 1/2012 | Chung | H04W 72/0453 370/329 |
| 2012/0051458 A1* | 3/2012 | Lee | H04J 13/0074 375/296 |
| 2014/0355545 A1* | 12/2014 | Chung | H04L 5/0048 370/329 |
| 2015/0295629 A1* | 10/2015 | Xia | H04B 7/0695 370/329 |
| 2016/0119100 A1* | 4/2016 | Chung | H04W 72/0453 370/329 |
| 2018/0124749 A1* | 5/2018 | Park | H04W 72/23 |
| 2022/0240277 A1* | 7/2022 | Ma | H04W 72/23 |
| 2023/0179352 A1* | 6/2023 | Horn | H04L 27/2646 370/329 |

FOREIGN PATENT DOCUMENTS

| | | | | |
|---|---|---|---|---|
| CN | 109565323 A | * | 4/2019 | H04B 7/0417 |
| CN | 106850023 B | * | 9/2020 | H04B 7/0684 |
| WO | WO-2014066785 A1 | * | 5/2014 | H04B 7/0491 |
| WO | WO-2015191530 A2 | * | 12/2015 | H04B 17/318 |
| WO | WO-2021166195 A1 | | 8/2021 | |

OTHER PUBLICATIONS

International Search Report and Written Opinion—PCT/US2022/078538—ISA/EPO—dated Feb. 14, 2023.

* cited by examiner

CYCLIC SHIFT REPORTING FOR A REFERENCE SIGNAL

FIELD OF TECHNOLOGY

The following relates to wireless communications, including cyclic shift reporting for a reference signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support cyclic shift reporting for a reference signal. Generally, the described techniques provide for a user equipment (UE) to report a cyclic shift to a base station (e.g., a network entity) which the base station may apply to a reference signal (e.g., a time-domain phase tracking reference signal (PTRS), a demodulation reference signal (DMRS), a channel state information (CSI) reference signal (CSI-RS)) to optimize an allocation of the reference signals and improve performance and power consumption at the UE. In some examples, the UE may indicate a capability of the UE to report a cyclic shift for a reference signal to the base station. Based on the capability, the UE may receive an indication of a reporting configuration from the base station indicating uplink resources for reporting the cyclic shift by the UE. The UE may receive one or more reference signal from the base station, and in response to receiving the reference signals, the UE may transmit an uplink message to the base station indicating the cyclic shift, where the cyclic shift may be based on a channel delay spread measurement by the UE of the one or more reference signals.

In some cases, the UE may estimate the cyclic shift based on the channel delay spread measurement, a phase noise mask measurement of the one or more reference signals, or both. Additionally or alternatively, the UE may estimate the cyclic shift based on applying a back-off to a cyclic prefix associated with the one or more reference signals. In some examples, the UE may receive signaling (e.g., a control message) from the base station indicating that the base station applied the cyclic shift reported by the UE to a reference signal. In some cases, the UE may receive the signaling indicating that the base station applied a cyclic shift to a reference signal different from the cyclic shift reported by the UE. As such, the UE may request that the base station update the applied cyclic shift such that it is the cyclic shift reported by the UE.

A method for wireless communications at a UE is described. The method may include transmitting, to a network entity, a capability message indicating a capability of the UE to report a cyclic shift for a reference signal, receiving, from the network entity, an indication of a reporting configuration based on the capability, the reporting configuration indicating uplink resources for reporting the cyclic shift by the UE, receiving one or more reference signals from the network entity, and transmitting, to the network entity and using the uplink resources, an uplink message indicating the cyclic shift, where the cyclic shift is based on a channel delay spread measurement by the UE of the one or more reference signals.

An apparatus for wireless communications at a UE is described. The apparatus may include a processor, memory coupled with the processor, and one or more instructions stored in the memory. The one or more instructions may be executable by the processor to cause the apparatus to, based on the one or more instructions, transmit, to a network entity, a capability message indicating a capability of the UE to report a cyclic shift for a reference signal, receive, from the network entity, an indication of a reporting configuration based on the capability, the reporting configuration indicating uplink resources for reporting the cyclic shift by the UE, receive one or more reference signals from the network entity, and transmit, to the network entity and using the uplink resources, an uplink message indicating the cyclic shift, where the cyclic shift is based on a channel delay spread measurement by the UE of the one or more reference signals.

Another apparatus for wireless communications at a UE is described. The apparatus may include means for transmitting, to a network entity, a capability message indicating a capability of the UE to report a cyclic shift for a reference signal, means for receiving, from the network entity, an indication of a reporting configuration based on the capability, the reporting configuration indicating uplink resources for reporting the cyclic shift by the UE, means for receiving one or more reference signals from the network entity, and means for transmitting, to the network entity and using the uplink resources, an uplink message indicating the cyclic shift, where the cyclic shift is based on a channel delay spread measurement by the UE of the one or more reference signals.

A non-transitory computer-readable medium storing code for wireless communications at a UE is described. The code may include instructions executable by a processor to transmit, to a network entity, a capability message indicating a capability of the UE to report a cyclic shift for a reference signal, receive, from the network entity, an indication of a reporting configuration based on the capability, the reporting configuration indicating uplink resources for reporting the cyclic shift by the UE, receive one or more reference signals from the network entity, and transmit, to the network entity and using the uplink resources, an uplink message indicating the cyclic shift, where the cyclic shift is based on a channel delay spread measurement by the UE of the one or more reference signals.

Some examples of the method, apparatuses, and non-transitory computer-readable medium described herein may further include operations, features, means, or instructions for measuring a channel delay spread of the one or more reference signals, a phase noise mask of the one or more reference signals, or both based on receiving the one or more reference signals and estimating the cyclic shift based on the channel delay spread measurement, the phase noise mask measurement, or both.

Some examples of the method, apparatuses, and non-transitory computer-readable medium described herein may further include operations, features, means, or instructions for estimating the cyclic shift based on applying a back-off to a cyclic prefix associated with the one or more reference signals.

In some examples of the method, apparatuses, and non-transitory computer-readable medium described herein, transmitting the uplink message indicating the cyclic shift may include operations, features, means, or instructions for transmitting the uplink message indicating a number of samples of the cyclic shift, a direction of the cyclic shift, or both.

In some examples of the method, apparatuses, and non-transitory computer-readable medium described herein, the uplink message includes a shared channel message including a quantity of bits indicating the number of samples of the cyclic shift, the direction of the cyclic shift, or both.

Some examples of the method, apparatuses, and non-transitory computer-readable medium described herein may further include operations, features, means, or instructions for receiving, from the network entity, a control message indicating that the network entity applied the cyclic shift indicated by the uplink message.

Some examples of the method, apparatuses, and non-transitory computer-readable medium described herein may further include operations, features, means, or instructions for receiving, from the network entity, a control message indicating that the network entity applied a cyclic shift different from the cyclic shift indicated by the uplink message.

Some examples of the method, apparatuses, and non-transitory computer-readable medium described herein may further include operations, features, means, or instructions for transmitting, to the network entity, a request for the network entity to update the applied cyclic shift based on the applied cyclic shift being different from the cyclic shift indicated in the uplink message.

Some examples of the method, apparatuses, and non-transitory computer-readable medium described herein may further include operations, features, means, or instructions for selecting the uplink resources for reporting the cyclic shift based on the capability of the UE to report the cyclic shift for the reference signal.

In some examples of the method, apparatuses, and non-transitory computer-readable medium described herein, transmitting the uplink message indicating the cyclic shift may include operations, features, means, or instructions for transmitting the uplink message indicating the cyclic shift according to a periodicity based on the reporting configuration.

In some examples of the method, apparatuses, and non-transitory computer-readable medium described herein, transmitting the uplink message indicating the cyclic shift may include operations, features, means, or instructions for transmitting the uplink message indicating the cyclic shift aperiodically based on the reporting configuration.

In some examples of the method, apparatuses, and non-transitory computer-readable medium described herein, transmitting the uplink message indicating the cyclic shift may include operations, features, means, or instructions for transmitting the uplink message indicating the cyclic shift via a shared channel, a control channel, channel state information, or any combination thereof.

In some examples of the method, apparatuses, and non-transitory computer-readable medium described herein, transmitting the capability message may include operations, features, means, or instructions for transmitting, to the network entity, a radio resource control (RRC) message indicating the capability of the UE to report the cyclic shift for the reference signal.

In some examples of the method, apparatuses, and non-transitory computer-readable medium described herein, transmitting the uplink message indicating the cyclic shift may include operations, features, means, or instructions for transmitting the uplink message indicating the cyclic shift a number of reference signal groups for location squeezing based on a phase noise associated with the one or more reference signals.

In some examples of the method, apparatuses, and non-transitory computer-readable medium described herein, the one or more reference signals includes a time-domain phase tracking reference signal (PTRS), a demodulation reference signal (DMRS), a channel state information (CSI) reference signal (CSI-RS), or any combination thereof.

A method for wireless communications at a network entity is described. The method may include receiving, from a UE, a capability message indicating a capability of the UE to report a cyclic shift for a reference signal, transmitting, to the UE, an indication of a reporting configuration based on the capability, the reporting configuration indicating uplink resources for reporting the cyclic shift by the UE, transmitting one or more reference signals to the UE, and receiving, from the UE and using the uplink resources, an uplink message indicating the cyclic shift, where the cyclic shift is based on a channel delay spread measurement by the UE of the one or more reference signals.

An apparatus for wireless communications at a network entity is described. The apparatus may include a processor, memory coupled with the processor, and one or more instructions stored in the memory. The one or more instructions may be executable by the processor to cause the apparatus to, based on the one or more instructions, receive, from a UE, a capability message indicating a capability of the UE to report a cyclic shift for a reference signal, transmit, to the UE, an indication of a reporting configuration based on the capability, the reporting configuration indicating uplink resources for reporting the cyclic shift by the UE, transmit one or more reference signals to the UE, and receive, from the UE and using the uplink resources, an uplink message indicating the cyclic shift, where the cyclic shift is based on a channel delay spread measurement by the UE of the one or more reference signals.

Another apparatus for wireless communications at a network entity is described. The apparatus may include means for receiving, from a UE, a capability message indicating a capability of the UE to report a cyclic shift for a reference signal, means for transmitting, to the UE, an indication of a reporting configuration based on the capability, the reporting configuration indicating uplink resources for reporting the cyclic shift by the UE, means for transmitting one or more reference signals to the UE, and means for receiving, from the UE and using the uplink resources, an uplink message indicating the cyclic shift, where the cyclic shift is based on a channel delay spread measurement by the UE of the one or more reference signals.

A non-transitory computer-readable medium storing code for wireless communications at a network entity is described. The code may include instructions executable by a processor to receive, from a UE, a capability message indicating a capability of the UE to report a cyclic shift for a reference signal, transmit, to the UE, an indication of a reporting configuration based on the capability, the reporting configuration indicating uplink resources for reporting the cyclic shift by the UE, transmit one or more reference signals to the UE, and receive, from the UE and using the uplink resources, an uplink message indicating the cyclic shift, where the cyclic shift is based on a channel delay spread measurement by the UE of the one or more reference signals.

In some examples of the method, apparatuses, and non-transitory computer-readable medium described herein, receiving the uplink message indicating the cyclic shift may include operations, features, means, or instructions for receiving the uplink message indicating a number of samples of the cyclic shift, a direction of the cyclic shift, or both.

In some examples of the method, apparatuses, and non-transitory computer-readable medium described herein, the uplink message includes a shared channel message including a quantity of bits indicating the number of samples of the cyclic shift, the direction of the cyclic shift, or both.

In some examples of the method, apparatuses, and non-transitory computer-readable medium described herein, receiving the uplink message indicating the cyclic shift may include operations, features, means, or instructions for transmitting the uplink message indicating the cyclic shift a number of reference signal groups for location squeezing based on a phase noise associated with the one or more reference signals.

Some examples of the method, apparatuses, and non-transitory computer-readable medium described herein may further include operations, features, means, or instructions for applying the cyclic shift to the one or more reference signals and transmitting, to the UE, a control message indicating that the network entity applied the cyclic shift indicated by the uplink message.

Some examples of the method, apparatuses, and non-transitory computer-readable medium described herein may further include operations, features, means, or instructions for transmitting, to the UE, a control message indicating that the network entity applied a cyclic shift different than the cyclic shift indicated by the uplink message.

Some examples of the method, apparatuses, and non-transitory computer-readable medium described herein may further include operations, features, means, or instructions for receiving, from the UE, a request for the network entity to update the applied cyclic shift based on the applied cyclic shift being different from the cyclic shift indicated in the uplink message.

In some examples of the method, apparatuses, and non-transitory computer-readable medium described herein, receiving the uplink message indicating the cyclic shift may include operations, features, means, or instructions for receiving the uplink message indicating the cyclic shift according to a periodicity based on the reporting configuration.

In some examples of the method, apparatuses, and non-transitory computer-readable medium described herein, receiving the uplink message indicating the cyclic shift may include operations, features, means, or instructions for receiving the uplink message indicating the cyclic shift aperiodically based on the reporting configuration.

In some examples of the method, apparatuses, and non-transitory computer-readable medium described herein, receiving the uplink message indicating the cyclic shift may include operations, features, means, or instructions for receiving the uplink message indicating the cyclic shift via a shared channel, a control channel, channel state information, or any combination thereof.

In some examples of the method, apparatuses, and non-transitory computer-readable medium described herein, receiving the capability message may include operations, features, means, or instructions for receiving, from the UE, an RRC message indicating the capability of the UE to report the cyclic shift for the reference signal.

In some examples of the method, apparatuses, and non-transitory computer-readable medium described herein, the one or more reference signals includes a time-domain PTRS, a DMRS, a CSI-RS, or any combination thereof.

DETAILED DESCRIPTION

Figure 1:
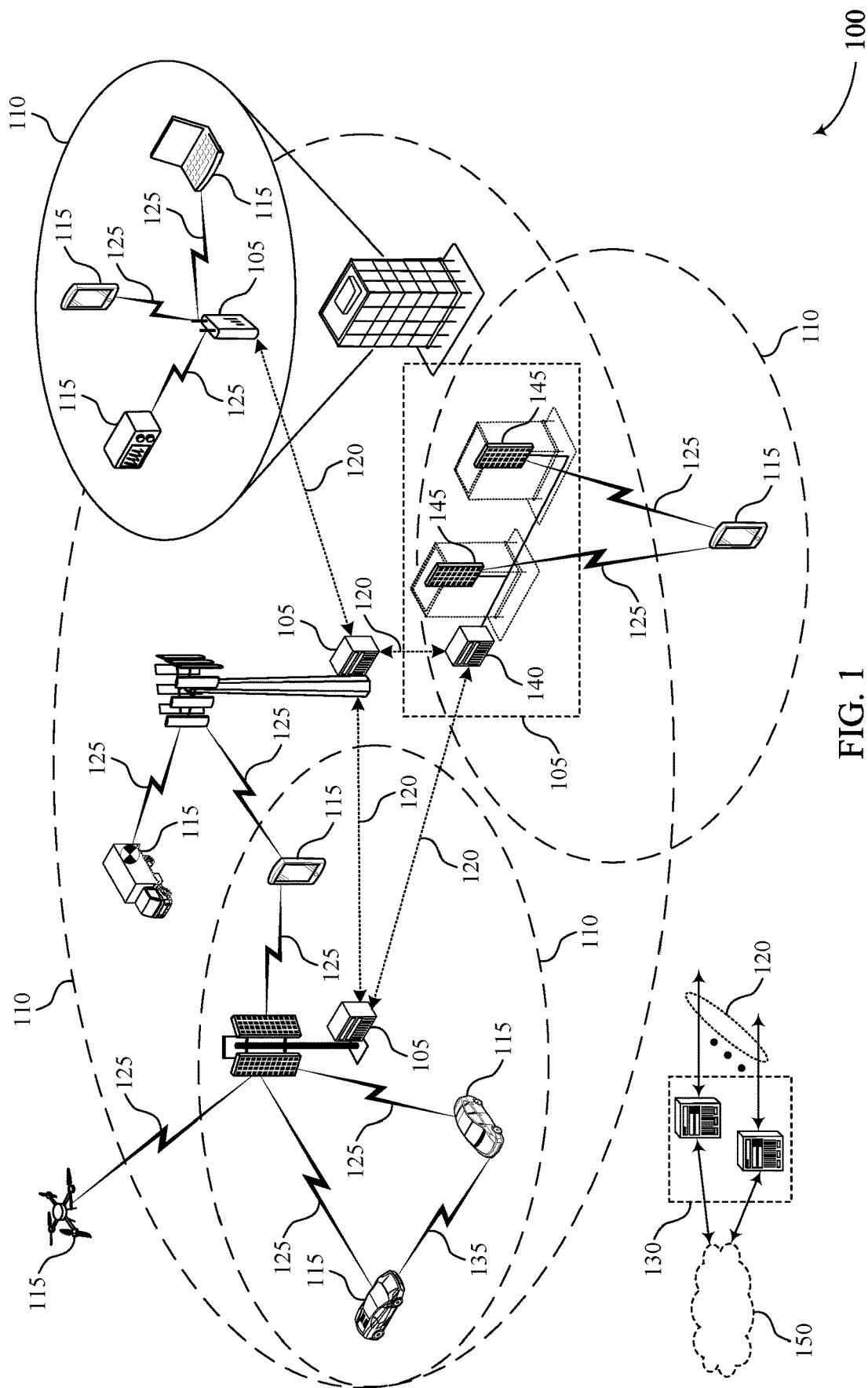
FIG. 1 illustrates an example of a wireless communications system that supports cyclic shift reporting for a reference signal in accordance with aspects of the present disclosure.

Some wireless communications systems may support larger bandwidths and higher data rates between wireless devices such as a user equipment (UE) and a base station (e.g., a network entity), which may increase power consumption at a UE. To account for higher bands, UEs and base stations may communicate using orthogonal frequency division multiplexing (OFDM) waveforms, which may increase throughput and channel robustness but maintain a relatively high power consumption. In some examples, a UE and a base station may communicate using reference signals (e.g., time-domain phase tracking reference signals (PTRSs)) for power reduction and low complexity phase noise mitigation. However, a UE may inaccurately estimate a phase noise depending on an allocation of the reference signals, which may decrease performance and increase power consumption at the UE.

Techniques described herein enable a UE to report a cyclic shift to a base station which the base station may apply to a reference signal (e.g., a time-domain PTRS, a demodulation reference signal (DMRS), a channel state information (CSI) reference signal (CSI-RS)) to optimize an allocation of the reference signals and improve performance and power consumption at the UE. In some examples, the UE may indicate a capability of the UE to report a cyclic shift for a reference signal to the base station. Based on the capability, the UE may receive an indication of a reporting configuration from the base station indicating uplink resources for reporting the cyclic shift by the UE. The UE may receive one or more reference signal from the base station, and in response to receiving the reference signals, the UE may transmit an uplink message to the base station indicating the cyclic shift, where the cyclic shift may be based on a channel delay spread measurement by the UE of the one or more reference signals.

In some cases, the UE may estimate the cyclic shift based on the channel delay spread measurement, a phase noise mask measurement of the one or more reference signals, or both. Additionally or alternatively, the UE may estimate the cyclic shift based on applying a back-off to a cyclic prefix associated with the one or more reference signals. In some examples, the UE may receive signaling (e.g., a control message) from the base station indicating that the base station applied the cyclic shift reported by the UE to a reference signal. In some cases, the UE may receive the signaling indicating that the base station applied a cyclic shift to a reference signal different from the cyclic shift reported by the UE. As such, the UE may request that the base station update the applied cyclic shift to be the cyclic shift reported by the UE.

Aspects of the disclosure are initially described in the context of wireless communications systems. Aspects of the disclosure are then illustrated by reference signal location squeezing diagrams and process flows. Aspects of the disclosure are further illustrated by and described with reference to apparatus diagrams, system diagrams, and flowcharts that relate to cyclic shift reporting for a reference signal.

FIG. 1 illustrates an example of a wireless communications system 100 that supports cyclic shift reporting for a reference signal in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

Deployment of wireless communication systems 100, such as 5G NR systems, may be arranged in multiple manners with various components or constituent parts. In a 5G NR system or network, a node, a network entity (e.g., an access network entity 140, an access network transmission entity 145) a mobility element of a network, an apparatus of a radio access network (RAN) node, a network element, or network equipment, such as a base station 105, or one or more devices performing base station functionality, may vary in configuration or operational characteristics. For example, a base station 105 (such as a Node B (NB), evolved NB (eNB), NR BS, 5G NB, access point (AP), a transmission/reception point (TRP) or other access network transmission entity 145, or a cell, etc.) may be an aggregated base station 105 (also known as a monolithic base station) or a disaggregated base station 105. In some aspects, an aggregated base station 105 may be configured to utilize a radio protocol stack that is logically integrated within a single RAN node. Conversely, a disaggregated base station 105 may be configured to utilize a protocol stack that is logically split between one or more units (such as one or more central units (CUs) and one or more distributed units (DUs)). In some aspects, the CUs may be implemented within an edge RAN node, and in some aspects, one or more DUs may be co-located with a CU, or may be geographically distributed throughout one or multiple RAN nodes. The DUs may be implemented to communicate with one or more radio units (RUs).

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an AP, a radio transceiver, an NB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems 100 may support larger bandwidths (e.g., frequency range (FR) 4, FR5, sixth generation (6G) communications) and higher data rates, which may increase power consumption at a UE 115. In some cases, a UE 115 may communicate using OFDM waveforms, which may support higher throughputs, channel robustness (e.g., high efficiency in fading channels), and MIMO communications, however, may have a relatively high power consumption. To account for higher bands, a UE 115 may use time-domain waveforms (e.g., time-domain PTRSs) for power reduction and low complexity phase noise mitigation. For example, a UE 115 may use time-domain PTRSs in a sub-terahertz (sub-THz) band which may have high integrated phase noises, where a time-domain PTRS may be a time-domain waveform (e.g., a DFT-s-OFDM) multiplexed with a reference signal. Additionally or alternatively, a UE 115 may use a DFT-s-OFDM waveform to mitigate inter-symbol interference (ISI) by frequency equalization and inter-carrier interference (ICI) by time-domain phase noise estimation. However, DFT-s-OFDM waveforms may be affected by the higher phase noise in higher bands.

In some examples, a UE 115 may perform uplink transmissions using an uplink reference signal (e.g., a PTRS). The UE 115 may use different reference signal allocations to estimate a phase noise of the reference signals. For example, a reference signal or a reference signal group may be located in the middle of a channel such that the UE 115 may interpolate the phase noise in the middle of the channel and extrapolate the phase noise at the edges of the channel, or the reference signal or reference signal group may be located at the edges of the channel such that the UE 115 may interpolate the phase noise at the edges of the channel and extrapolate the phase noise at the middle of the channel. In some examples, different reference signal allocations may result in inaccurate phase noise estimations if a sampling offset occurs (e.g., due to a channel delay spread or back-off for ISI reduction).

In some cases, doppler shift and phase noise may impair a received signal, which may be represented as a multiplication by rotating a phasor in the time domain. As such, a UE 115 may apply a back-off to the signal before performing a fast Fourier transform (FFT) operation to reduce ISI and track dynamic timing changes to the signal. However, the back-off of an FFT operation (e.g., an FFT frame) may introduce an effect of a circular shift in the rotating phasor. That is, the back-off (e.g., or channel delay spread) may cause the FFT frame to start during a cyclic prefix of the signal instead of at the beginning of an OFDM symbol, which may alter a phase ramp and corresponding phase noise associated the signal. For example, the back-off may cause a discontinuity in the phase ramp, and as such the UE may inaccurately estimate the doppler shift and phase noise (e.g., representing the angle of the phase ramp). In some examples, the back-off inside of the cyclic prefix (e.g., or a channel delay spread) may result in reference signals being allocated at the beginning of a channel but not the end (e.g., on a first edge), which may limit the ability of the UE 115 to estimate the phase noise. To mitigate this limited phase noise estimation, a reference signal may be located in the middle of the signal. However, this allocation may cause the UE to extrapolate the phase noise toward the beginning and end of the phase ramp, introducing additional errors to the phase noise estimation. In some examples, higher bands (e.g., a subTHz band) may cause the phase noise to change rapidly. As such, a UE 115 may estimate a phase in each symbol of a channel to accurately estimate an overall phase noise.

In some cases, the UE 115 may report a channel delay spread, a back-off, a discontinuity in the phase ramp (e.g., a distance from the edge of the phase ramp to the discontinuity), or any combination thereof to a base station 105. The base station 105 may compensate for the error reported by the UE 115 and transmit reference signals at the particular times of the errors to prevent the UE 115 from extrapolating the phase noise or producing other errors in estimating the phase noise. For example, if a back-off from a cyclic prefix before an FFT frame is known, the UE may estimate a channel delay spread and add the channel delay spread to the back-off to summarize the overall cyclic shift that may be applied to a reference signal. In some examples, the cyclic shift may provide a window in the time domain that enables a positive time drift and the channel delay spread (e.g., where the FFT back-off enables a negative time drift). The UE may indicate the cyclic shift to the base station such that the base station may apply it to a reference signal and reduce errors associated with the phase noise.

Techniques described herein enable a UE 115 to report a cyclic shift to a base station 105, which the base station 105 may apply to a reference signal (e.g., a time-domain PTRS, a DMRS, a CSI-RS) to optimize an allocation of the reference signals and improve performance and power consumption at the UE 115. In some examples, the UE 115 may indicate a capability of the UE 115 to report a cyclic shift for a reference signal to the base station 105. Based on the capability, the UE 115 may receive an indication of a reporting configuration from the base station 105 indicating uplink resources for reporting the cyclic shift by the UE 115. The UE 115 may receive one or more reference signal from the base station 105, and in response to receiving the reference signals, the UE 115 may transmit an uplink message to the base station 105 indicating the cyclic shift, where the cyclic shift may be based on a channel delay spread measurement by the UE 115 of the one or more reference signals.

In some cases, the UE 115 may estimate the cyclic shift based on the channel delay spread measurement, a phase noise mask measurement of the one or more reference signals, or both. Additionally or alternatively, the UE 115 may estimate the cyclic shift based on applying a back-off to a cyclic prefix associated with the one or more reference signals. In some examples, the UE 115 may receive signaling (e.g., a control message) from the base station 105 indicating that the base station 105 applied the cyclic shift reported by the UE 115 to a reference signal. In some cases, the UE 115 may receive the signaling indicating that the base station 105 applied a cyclic shift to a reference signal different from the cyclic shift reported by the UE 115. As such, the UE 115 may request that the base station 105 update the applied cyclic shift such that it is the cyclic shift reported by the UE 115.

Figure 2:
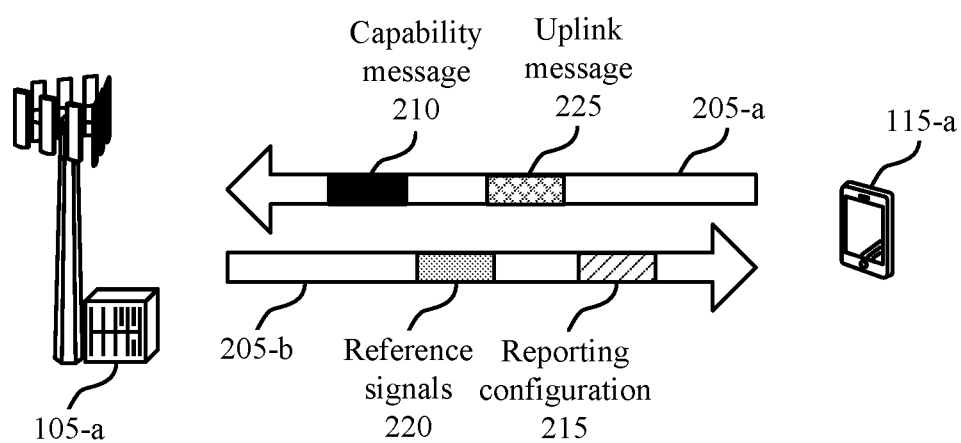
FIG. 2 illustrates an example of a wireless communications system that supports cyclic shift reporting for a reference signal in accordance with aspects of the present disclosure.

FIG. 2 illustrates an example of a wireless communications system 200 that supports cyclic shift reporting for a reference signal in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a and a base station 105-a, which may be examples of corresponding devices described herein.

The wireless communications system 200 may support techniques for reporting a cyclic shift for a reference signal (e.g., a time-domain PTRS, a DMRS, a CSI-RS) to improve performance and power consumption at the UE 115-a. For example, the UE 115-a may use measurements of a channel delay spread, a phase noise mask, a back-off, or any combination thereof to optimize a cyclic shift for the reference signal, which may optimize locations of reference signals and reduce errors caused by phase noise. Upon establishing a connection with the base station 105-a (e.g., a network entity) via communication links 205, the UE 115-a may transmit a capability message 210 to the base station 105-a via a communication link 205-a. The capability message 210 may indicate a capability of the UE to report a cyclic shift for a reference signal. In some cases, the UE 115-a may transmit the capability message 210 via an RRC message or in a routine report to the base station 105-a.

In some cases, based on the capability, the base station 105-a may transmit a reporting configuration 215 to the UE 115-a and via a communication link 205-b indicating uplink resources the UE 115-a may use for reporting the cyclic shift. In some examples, the uplink resources may include a dedicated slot or other time interval. For example, the base station 105-a may boost a DMRS in the dedicated slot to improve channel estimation by the UE 115-a when estimating the cyclic shift. Additionally or alternatively, the UE 115-a may select the uplink resources for reporting the cyclic shift based on the capability. In some examples, the capability message 210 may indicate that the UE 115-a may estimate the cyclic shift based on data or a DMRS, which the base station 105-a may use to determine the uplink resources for reporting the cyclic shift by the UE 115-a.

In some examples, the UE 115-a may receive one or more reference signals 220 from the base station 105-a. Based on receiving the reference signals 220, the UE 115-a may measure a channel delay spread of the reference signals 220, a phase noise mask of the reference signals 220, or both, and the UE 115-a may estimate the cyclic shift (e.g., measure a distance of a discontinuity in a phase ramp from the edge of the phase ramp based on an error vector magnitude (EVM)) based on the channel delay spread measurement, the phase noise mask measurement, or both. For example, a channel delay spread may affect the offset of the reference signal. In some examples, the UE 115-a may receive data or reference signals from the base station 105-a with which to calculate the channel delay spread. Additionally or alternatively, the UE 115-a may estimate the cyclic shift based on applying a back-off to a cyclic prefix before an FFT operation.

The UE 115-a may transmit an uplink message 225 indicating the cyclic shift to the base station 105-a and using the uplink resources. In some examples, the uplink message 225 may include a number of samples to cyclic shift the reference signal and to which direction (e.g., the sign of the cyclic shift), which may be represented in a fixed number of bits in a physical uplink shared channel (PUSCH) transmission. In some examples, the base station 105-a may request for the UE 115-a to transmit the uplink message 225 (e.g., report a cyclic shift) periodically, aperiodically, or based on different factors (e.g., channel delay spread, doppler spread, variance in the estimated cyclic shift). Additionally or alternatively, the UE 115-a may request that the base station 105-a triggers transmission of the uplink message 225 based on the UE 115-a identifying a large, measured channel delay spread or other channel metric.

In some examples, the UE 115-a may transmit the uplink message according to a periodicity (e.g., periodically) or aperiodically based on the reporting configuration 215. Additionally or alternatively, the UE 115-a may transmit the uplink message via a PUSCH, a physical uplink control channel (PUCCH), a CSI report, or any combination thereof. In some cases, the UE 115-a may report reference signal location squeezing if there is variance in the estimated cyclic shift, as described with reference to FIGS. 3A-3C. By indicating the cyclic shift in the uplink message 225, the reference signals may be allocated to the edges of an OFDM symbol without adding complexity at the UE 115-a, which may enhance phase noise mitigation without using phase noise extrapolation, thus improving overall performance of the UE 115-a.

In some examples, the base station 105-a may transmit a control message to the UE 115-a indicating that the base station 105-a applied the cyclic shift indicated in the uplink message 225 to a reference signal. For example, the base station 105-a may transmit one bit in downlink control information (DCI), a MAC control element (MAC-CE), or any combination thereof indicating that the base station 105-a applied the cyclic shift included in the uplink message 225 to a reference signal. In some cases, the base station 105-a may transmit a control message to the UE 115-a indicating that the base station 105-a applied a cyclic shift different from the cyclic shift indicated in the uplink message 225. Additionally or alternatively, the UE 115-a may identify that the cyclic shift applied by the base station 105-a is different from the cyclic shift indicated in the uplink message 225, or the UE 115-a may identify an error in phase noise estimation which may indicate that the base station 105-a applied the cyclic shift different from the reported cyclic shift. As such, the UE 115-a may transmit a request for the base station 105-a to update the applied cyclic shift based on the applied cyclic shift being different from the cyclic shift indicated in the uplink message, and the base station may update the cyclic shift accordingly (e.g., as requested by the UE 115-a).

Figure 3A:
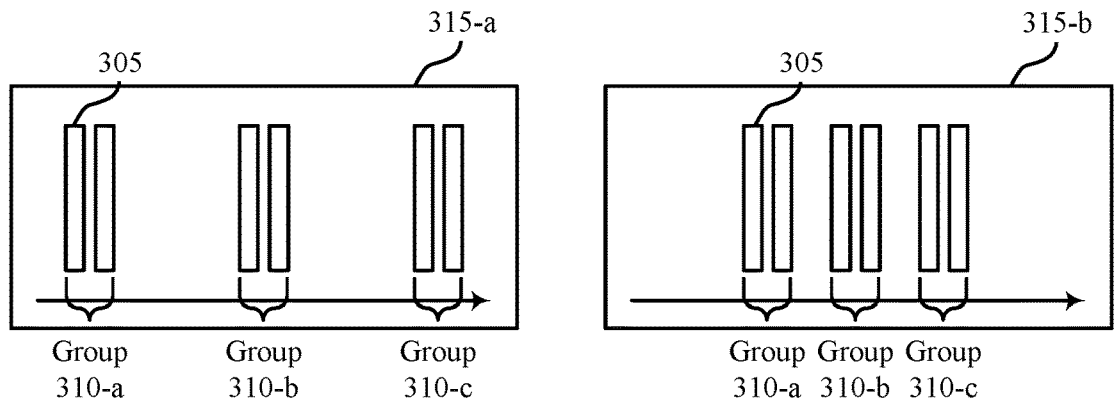
FIGS. 3A through 3C illustrate examples of reference signal location squeezing that support cyclic shift reporting for a reference signal in accordance with aspects of the present disclosure.

FIG. 3A illustrates an example of reference signal location squeezing 300-a that supports cyclic shift reporting for a reference signal in accordance with aspects of the present disclosure. In some examples, the reference signal location squeezing 300-a may be implemented by aspects of the wireless communications systems 100 and 200. For example, a UE may receive one or more reference signals 305 (e.g., a PTRS, a DMRS, a CSI-RS or any combination thereof) from a base station (e.g., a network entity).

As described herein, the UE may estimate a cyclic shift for a reference signal 305 based on a channel delay spread measurement, a phase noise mask measurement, a back-off, or any combination thereof. The UE may report the cyclic shift to the base station, and the base station may apply the cyclic shift to one or more reference signals 305 in one or more reference signal groups 310. In some examples, the UE may report reference signal location squeezing to the base station if there is variance in the estimated cyclic shift (e.g., caused by phase noise). For example, a reference signal group 310 may include edged reference signal groups (e.g., reference signals at the beginning or edge of a channel 315), which may include different numbers of reference signals 305 (e.g., 2, 4, 8, 16). In some cases, reference signal location squeezing may impact the number of reference signals 305 in a reference signal group 310, the spacing between the reference signal groups 310, the locations of the reference signal groups 310, or any combination thereof. For example, the UE may estimate an integrated phase noise which may cause the number of reference signals 305 in a reference signal group 310 to increase (e.g., because of variance in the integrated phase noise).

In some cases, a UE may report a cyclic shift to the base station, and the base station may apply the reported cyclic shift to the reference signals 305 in a reference signal group 310-a, a reference signal group 310-b, and a reference signal group 310-c in a channel 315-a. Each reference signal group 310 may include two reference signals 305. In some cases, the UE may estimate a variance in the estimated cyclic shift and indicate a reference signal location squeezing to the base station As shown in FIG. 3A, the squeezing may change the distance between each reference signal group 310. For example, the reference signal group 310-a, the reference signal group 310-b, and the reference signal group 310-c may be closer together in a channel 315-b (e.g., after the reference signal location squeezing is applied) than in the channel 315-a.

Figure 3B:
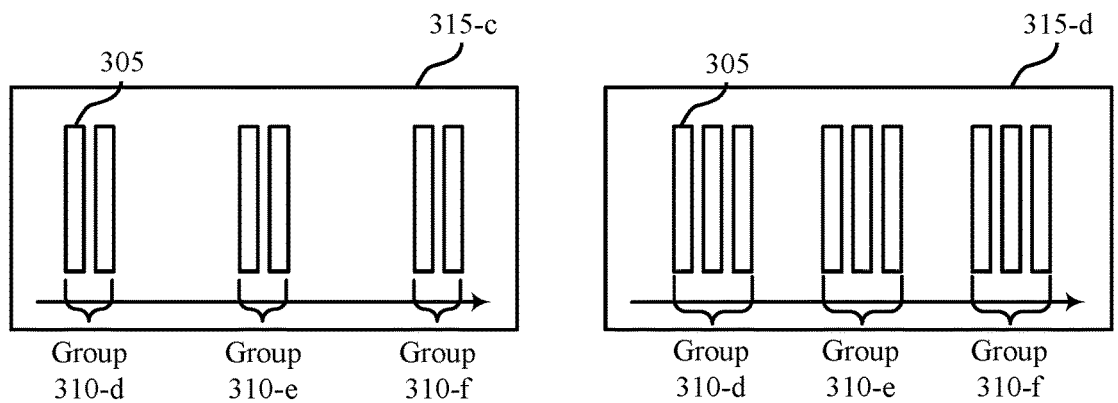

FIG. 3B illustrates an example of reference signal location squeezing 300-b that supports cyclic shift reporting for a reference signal in accordance with aspects of the present disclosure. In some examples, the reference signal location squeezing 300-b may be implemented by aspects of the wireless communications systems 100 and 200. For example, a UE may receive one or more reference signals 305 (e.g., a PTRS, a DMRS, a CSI-RS or any combination thereof) from a base station (e.g., a network entity).

As described with reference to FIG. 3A, the UE may report reference signal location squeezing to the base station if there is variance in an estimated cyclic shift (e.g., caused by phase noise). For example, a reference signal group 310 may include edged reference signal groups (e.g., reference signals at the beginning or edge of a channel 315), which may include different numbers of reference signals 305 (e.g., 2, 4, 8, 16). In some cases, reference signal location squeezing may impact the number of reference signals 305 in a reference signal group 310, the spacing between the reference signal groups 310, the locations of the reference signal groups 310, or any combination thereof. For example, the UE may estimate an integrated phase noise which may cause the number of reference signals 305 in a reference signal group 310 to increase (e.g., because of variance in the integrated phase noise).

In some cases, a UE may report a cyclic shift to the base station, and the base station may apply the reported cyclic shift to the reference signals 305 in a reference signal group 310-d, a reference signal group 310-e, and a reference signal group 310-f in a channel 315-c. Each reference signal group 310 may include two reference signals 305. In some cases, the UE may estimate a variance in the estimated cyclic shift and indicate a reference signal location squeezing to the base station As shown in FIG. 3B, the squeezing may change the number of reference signals 305 in each reference signal group 310. For example, the reference signal group 310-d, the reference signal group 310-e, and the reference signal group 310-f may each include three reference signals 305 in a channel 315-d (e.g., after the reference signal location squeezing is applied) instead of the two reference signals 305 per reference signal group 310 in the channel 315-c, while the distance between each reference signal group 310 may stay the same in the channel 315-c and the channel 315-d.

Figure 3C:
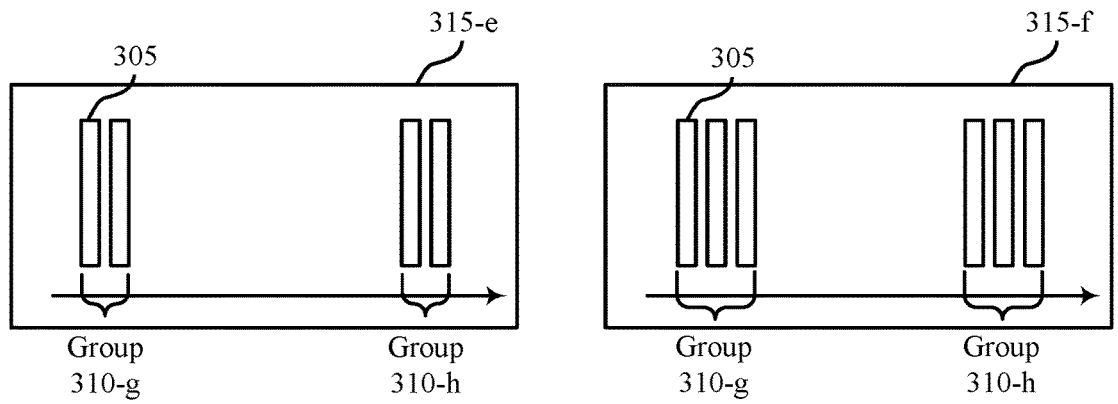

FIG. 3C illustrates an example of reference signal location squeezing 300-b that supports cyclic shift reporting for a reference signal in accordance with aspects of the present disclosure. In some examples, the reference signal location squeezing 300-c may be implemented by aspects of the wireless communications systems 100 and 200. For example, a UE may receive one or more reference signals 305 (e.g., a PTRS, a DMRS, a CSI-RS or any combination thereof) from a base station (e.g., a network entity).

As described with reference to FIG. 3A, the UE may report reference signal location squeezing to the base station if there is variance in an estimated cyclic shift (e.g., caused by phase noise). For example, a reference signal group 310 may include edged reference signal groups (e.g., reference signals at the beginning or edge of a channel 315), which may include different numbers of reference signals 305 (e.g., 2, 4, 8, 16). In some cases, reference signal location squeezing may impact the number of reference signals 305 in a reference signal group 310, the spacing between the reference signal groups 310, the locations of the reference signal groups 310, or any combination thereof. For example, the UE may estimate an integrated phase noise which may cause the number of reference signals 305 in a reference signal group 310 to increase (e.g., because of variance in the integrated phase noise).

In some cases, a UE may report a cyclic shift to the base station, and the base station may apply the reported cyclic shift to the reference signals 305 in a reference signal group 310-g and a reference signal group 310-h. Each reference signal group 310 may include two reference signals 305 and may occur on the edges of the channel 315-e. In some cases, the UE may estimate a variance in the estimated cyclic shift and indicate a reference signal location squeezing to the base station. As shown in FIG. 3C, the squeezing may change the number of reference signals 305 in each reference signal group 310 on the edge of the channel 315-e. For example, the reference signal group 310-g and the reference signal group 310-h may each include three reference signals 305 in a channel 315-f (e.g., after the reference signal location squeezing is applied) instead of the two reference signals 305 per reference signal group 310 in the channel 315-e, while the locations of each reference signal group 310 at the edges of the channels 315 may stay the same in the channel 315-e and the channel 315-f.

Figure 4:
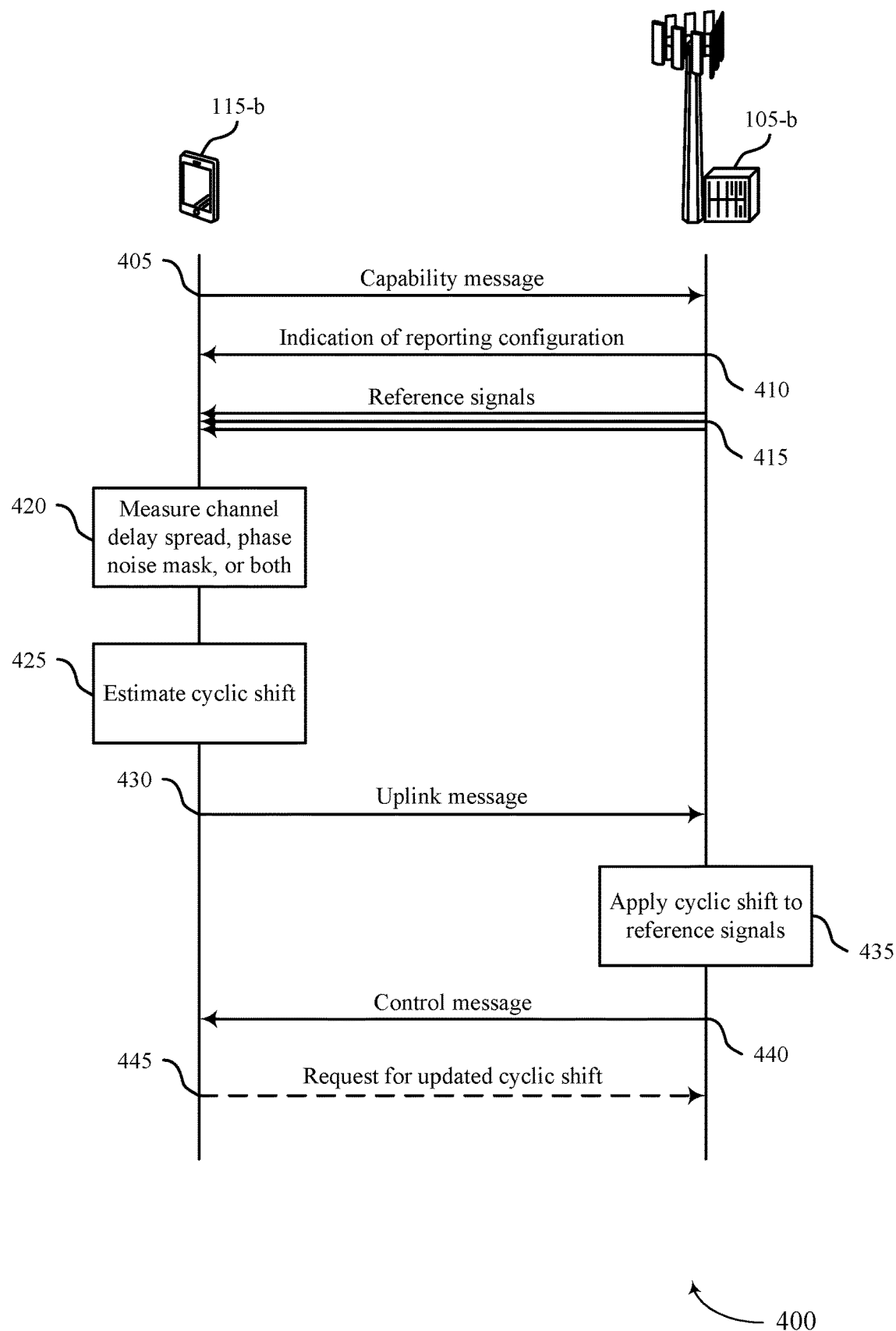
FIG. 4 illustrates an example of a process flow that supports cyclic shift reporting for a reference signal in accordance with aspects of the present disclosure.

FIG. 4 illustrates an example of a process flow 400 that supports cyclic shift reporting for a reference signal in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 115-b and a base station 105-b, which may be examples of corresponding devices described herein. In the following description of the process flow 400, the operations between the UE 115-b and the base station 105-b may be transmitted in a different order than the example order shown, or the operations performed by the UE 115-b and the base station 105-b may be performed in different orders or at different times. Some operations may also be omitted from the process flow 400, and other operations may be added to the process flow 400.

At 405, the UE 115-b may transmit, to the base station 105-b (e.g., a network entity), a capability message indicating a capability of the UE 115-b to report a cyclic shift for a reference signal, where the reference signal may be a PTRS (e.g., a time-domain PTRS), a DMRS, or a CSI-RS.

At 410, the UE 115-b may receive, from the base station 105-b, an indication of a reporting configuration based on the capability, the reporting configuration indicating uplink resources for reporting the cyclic shift by the UE 115-b. In some examples, the uplink resources may include a dedicated slot. Additionally or alternatively, the UE 115-b may determine the uplink resources to use for reporting the cyclic shift.

At 415, the UE 115-b may receive, from the base station 105-b, one or more reference signals (e.g., one or more of a PTRS, a DMRS, a CSI-RS, or any combination thereof). At 420, the UE 115-b may measure a channel delay spread of the one or more reference signals, a phase noise mask of the one or more reference signals, or both based on receiving the one or more reference signals. Additionally or alternatively, the UE 115-b may apply a back-off to a cyclic prefix (e.g., and before an FFT operation).

At 425, the UE 115-b may estimate the cyclic shift based on the channel delay spread measurement, the phase noise mask measurement, or both. In some examples, the UE 115-b may estimate the cyclic shift based on applying the back-off.

At 430, the UE 115-b may transmit, to the base station 105-b and using the uplink resources, an uplink message indicating the cyclic shift. In some examples, the UE 115-b may transmit the uplink message according to a periodicity or aperiodically. In addition, the uplink message may indicate a number of samples of the cyclic shift and a direction of the cyclic shift. At 435, the base station 105-b may apply the cyclic shift indicated in the uplink message to the one or more reference signals. In some examples, the base station 105-b may apply a different cyclic shift from the cyclic shift indicated in the uplink message.

At 440, the UE 115-b may receive, from the base station 105-b, a control message indicating that the base station 105-b applied the cyclic shift indicated in the uplink message. In some examples, the UE 115-b may receive a control message indicating that the base station 105-b applied the different cyclic shift from the cyclic shift indicated in the uplink message.

At 445, the UE 115-b may request for the base station 105-b to update the applied cyclic shift based on the applied cyclic shift being different from the cyclic shift indicated in the uplink message, and the base station 105-b may update the applied cyclic shift based on the request from the UE 115-b.

Figure 5:
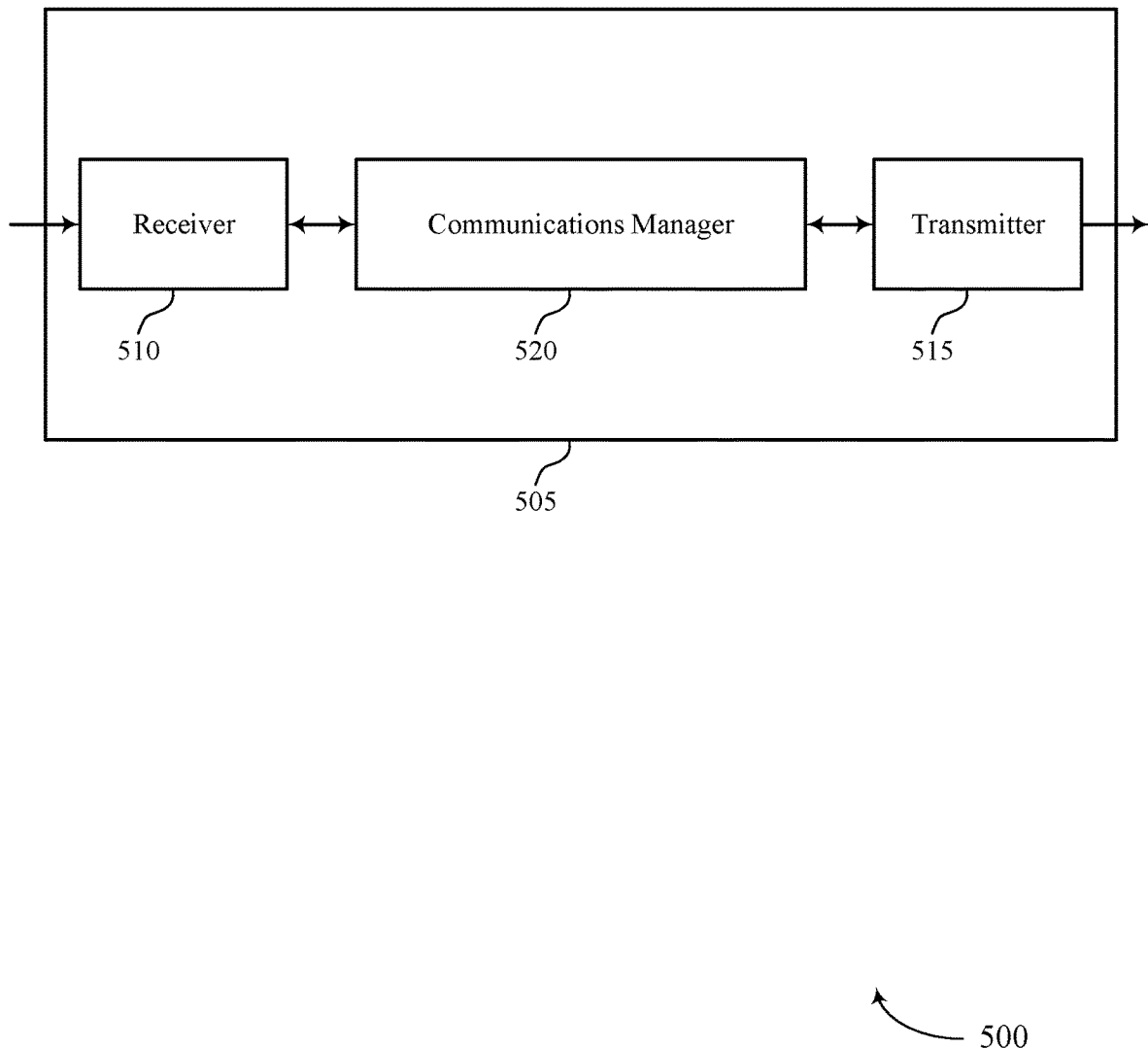
FIGS. 5 and 6 show block diagrams of devices that support cyclic shift reporting for a reference signal in accordance with aspects of the present disclosure.

FIG. 5 shows a block diagram 500 of a device 505 that supports cyclic shift reporting for a reference signal in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to cyclic shift reporting for a reference signal). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to cyclic shift reporting for a reference signal). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of cyclic shift reporting for a reference signal as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a network entity, a capability message indicating a capability of the UE to report a cyclic shift for a reference signal. The communications manager 520 may be configured as or otherwise support a means for receiving, from the network entity, an indication of a reporting configuration based on the capability, the reporting configuration indicating uplink resources for reporting the cyclic shift by the UE. The communications manager 520 may be configured as or otherwise support a means for receiving one or more reference signals from the network entity. The communications manager 520 may be configured as or otherwise support a means for transmitting, to the network entity and using the uplink resources, an uplink message indicating the cyclic shift, where the cyclic shift is based on a channel delay spread measurement by the UE of the one or more reference signals.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reporting a cyclic shift for a reference signal, which may reduce power consumption and improve overall performance as errors due to phase noise may be reduced.

Figure 6:
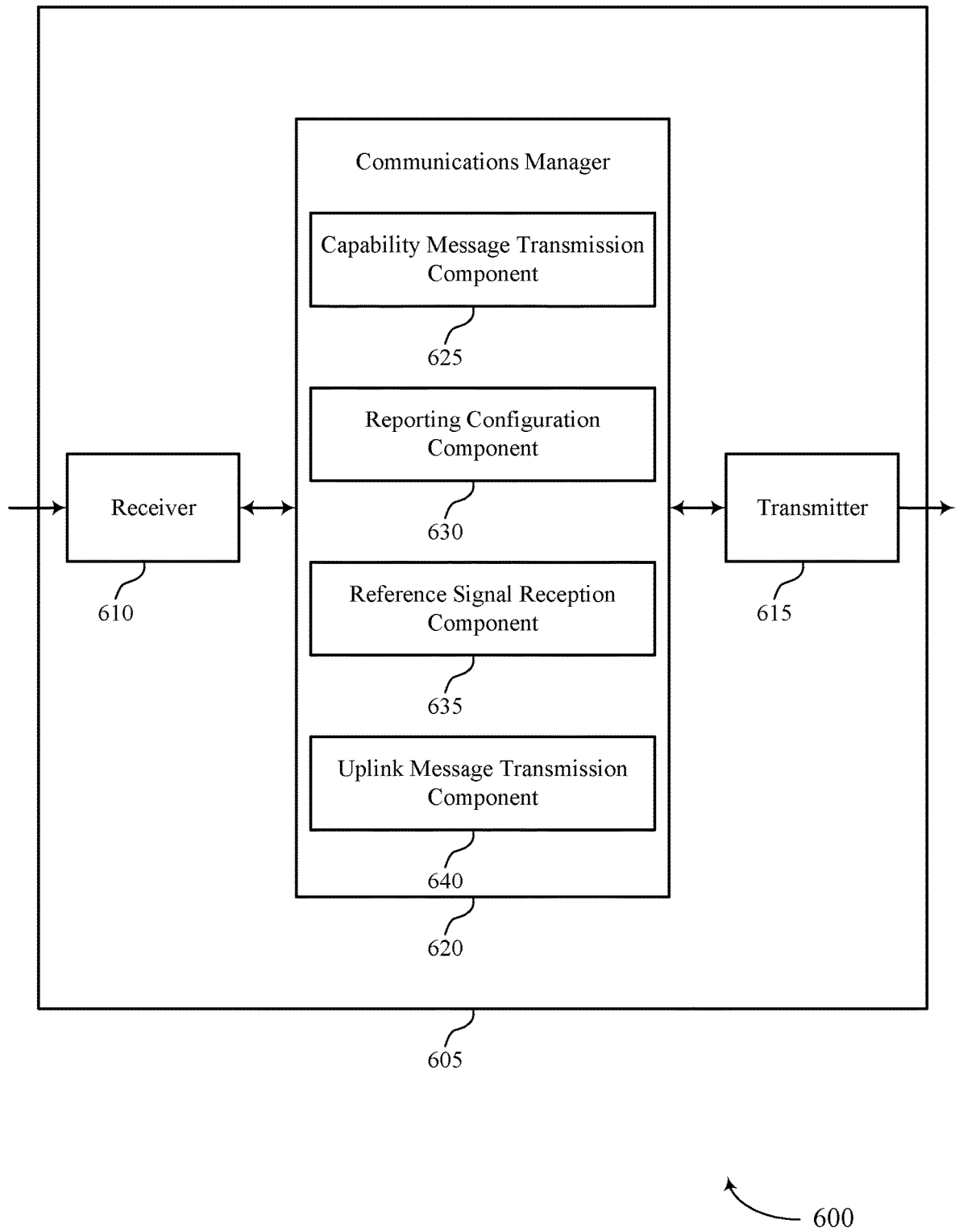

FIG. 6 shows a block diagram 600 of a device 605 that supports cyclic shift reporting for a reference signal in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cyclic shift reporting for a reference signal). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cyclic shift reporting for a reference signal). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of cyclic shift reporting for a reference signal as described herein. For example, the communications manager 620 may include a capability message transmission component 625, a reporting configuration component 630, a reference signal reception component 635, an uplink message transmission component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The capability message transmission component 625 may be configured as or otherwise support a means for transmitting, to a network entity, a capability message indicating a capability of the UE to report a cyclic shift for a reference signal. The reporting configuration component 630 may be configured as or otherwise support a means for receiving, from the network entity, an indication of a reporting configuration based on the capability, the reporting configuration indicating uplink resources for reporting the cyclic shift by the UE. The reference signal reception component 635 may be configured as or otherwise support a means for receiving one or more reference signals from the network entity. The uplink message transmission component 640 may be configured as or otherwise support a means for transmitting, to the network entity and using the uplink resources, an uplink message indicating the cyclic shift, where the cyclic shift is based on a channel delay spread measurement by the UE of the one or more reference signals.

Figure 7:
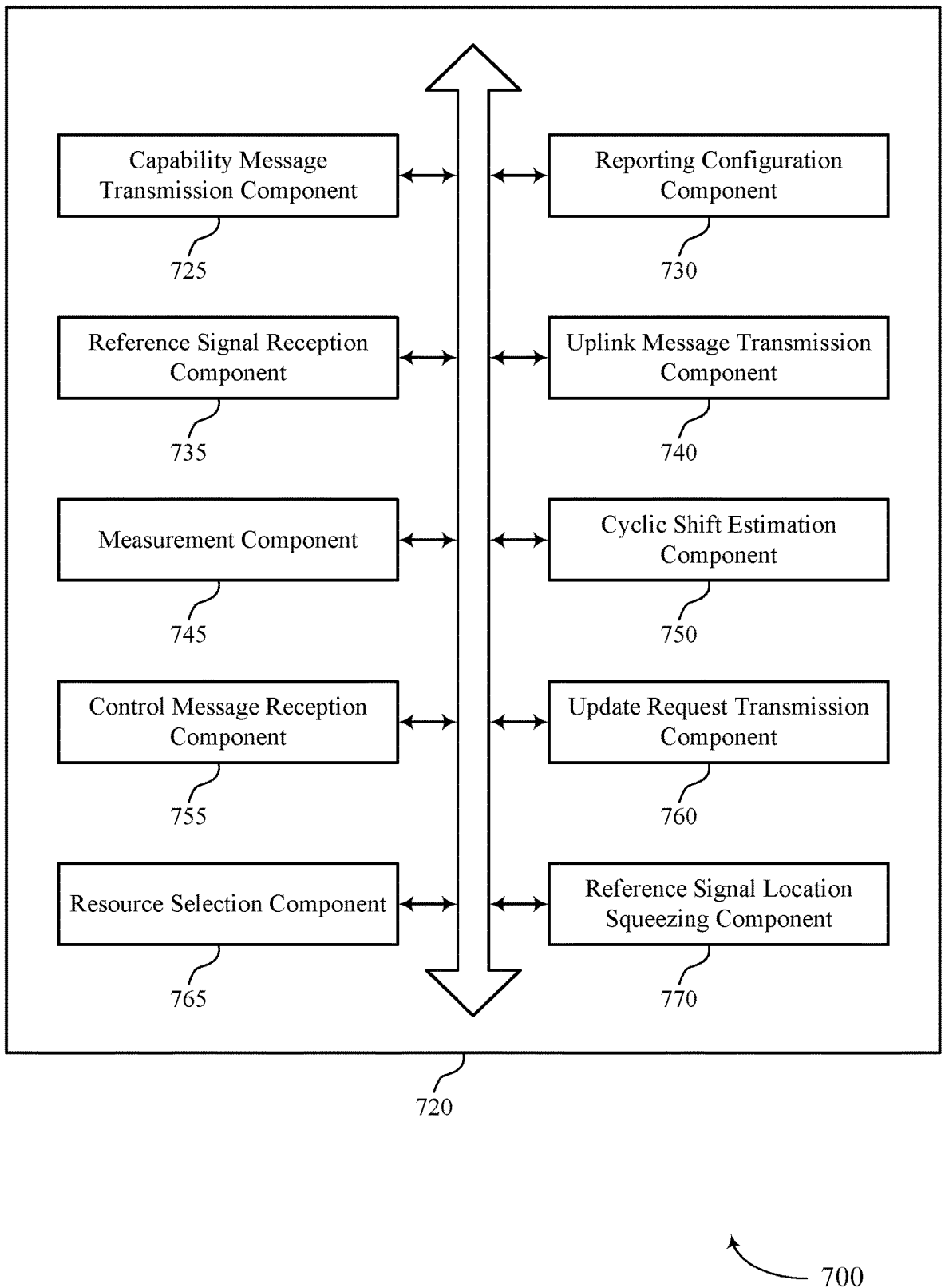
FIG. 7 shows a block diagram of a communications manager that supports cyclic shift reporting for a reference signal in accordance with aspects of the present disclosure.

FIG. 7 shows a block diagram 700 of a communications manager 720 that supports cyclic shift reporting for a reference signal in accordance with aspects of the present disclosure. The communications manager 720 may be an example of aspects of a communications manager 520, a communications manager 620, or both, as described herein. The communications manager 720, or various components thereof, may be an example of means for performing various aspects of cyclic shift reporting for a reference signal as described herein. For example, the communications manager 720 may include a capability message transmission component 725, a reporting configuration component 730, a reference signal reception component 735, an uplink message transmission component 740, a measurement component 745, a cyclic shift estimation component 750, a control message reception component 755, an update request transmission component 760, a resource selection component 765, a reference signal location squeezing component 770, or any combination thereof. Each of these components may communicate, directly or indirectly, with one another (e.g., via one or more buses).

The communications manager 720 may support wireless communications at a UE in accordance with examples as disclosed herein. The capability message transmission component 725 may be configured as or otherwise support a means for transmitting, to a network entity, a capability message indicating a capability of the UE to report a cyclic shift for a reference signal. The reporting configuration component 730 may be configured as or otherwise support a means for receiving, from the network entity, an indication of a reporting configuration based on the capability, the reporting configuration indicating uplink resources for reporting the cyclic shift by the UE. The reference signal reception component 735 may be configured as or otherwise support a means for receiving one or more reference signals from the network entity. The uplink message transmission component 740 may be configured as or otherwise support a means for transmitting, to the network entity and using the uplink resources, an uplink message indicating the cyclic shift, where the cyclic shift is based on a channel delay spread measurement by the UE of the one or more reference signals.

In some examples, the measurement component 745 may be configured as or otherwise support a means for measuring a channel delay spread of the one or more reference signals, a phase noise mask of the one or more reference signals, or both based on receiving the one or more reference signals. In some examples, the cyclic shift estimation component 750 may be configured as or otherwise support a means for estimating the cyclic shift based on the channel delay spread measurement, the phase noise mask measurement, or both.

In some examples, the cyclic shift estimation component 750 may be configured as or otherwise support a means for estimating the cyclic shift based on applying a back-off to a cyclic prefix associated with the one or more reference signals.

In some examples, to support transmitting the uplink message indicating the cyclic shift, the uplink message transmission component 740 may be configured as or otherwise support a means for transmitting the uplink message indicating a number of samples of the cyclic shift, a direction of the cyclic shift, or both. In some examples, the uplink message includes a shared channel message including a quantity of bits indicating the number of samples of the cyclic shift, the direction of the cyclic shift, or both.

In some examples, the control message reception component 755 may be configured as or otherwise support a means for receiving, from the network entity, a control message indicating that the network entity applied the cyclic shift indicated by the uplink message.

In some examples, the control message reception component 755 may be configured as or otherwise support a means for receiving, from the network entity, a control message indicating that the network entity applied a cyclic shift different from the cyclic shift indicated by the uplink message.

In some examples, the update request transmission component 760 may be configured as or otherwise support a means for transmitting, to the network entity, a request for the network entity to update the applied cyclic shift based on the applied cyclic shift being different from the cyclic shift indicated in the uplink message.

In some examples, the resource selection component 765 may be configured as or otherwise support a means for selecting the uplink resources for reporting the cyclic shift based on the capability of the UE to report the cyclic shift for the reference signal. In some examples, to support transmitting the uplink message indicating the cyclic shift, the uplink message transmission component 740 may be configured as or otherwise support a means for transmitting the uplink message indicating the cyclic shift according to a periodicity based on the reporting configuration.

In some examples, to support transmitting the uplink message indicating the cyclic shift, the uplink message transmission component 740 may be configured as or otherwise support a means for transmitting the uplink message indicating the cyclic shift aperiodically based on the reporting configuration.

In some examples, to support transmitting the uplink message indicating the cyclic shift, the uplink message transmission component 740 may be configured as or otherwise support a means for transmitting the uplink message indicating the cyclic shift via a shared channel, a control channel, CSI, or any combination thereof.

In some examples, to support transmitting the capability message, the capability message transmission component 725 may be configured as or otherwise support a means for transmitting, to the network entity, an RRC message indicating the capability of the UE to report the cyclic shift for the reference signal.

In some examples, to support transmitting the uplink message indicating the cyclic shift, the reference signal location squeezing component 770 may be configured as or otherwise support a means for transmitting the uplink message indicating the cyclic shift a number of reference signal groups for location squeezing based on a phase noise associated with the one or more reference signals. In some examples, the one or more reference signals includes a time-domain PTRS, a DMRS, a CSI-RS, or any combination thereof.

Figure 8:
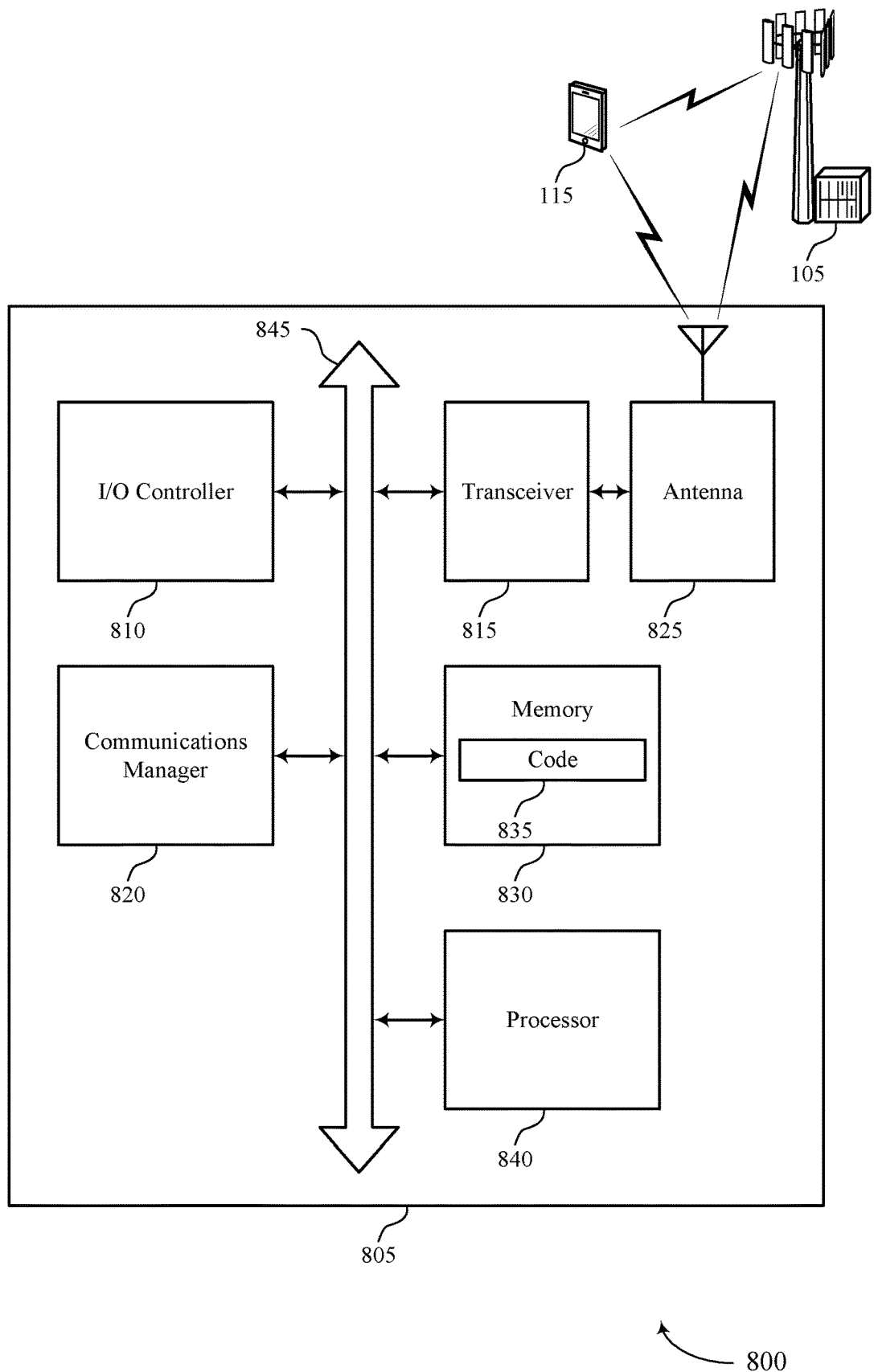
FIG. 8 shows a diagram of a system including a device that supports cyclic shift reporting for a reference signal in accordance with aspects of the present disclosure.

FIG. 8 shows a diagram of a system 800 including a device 805 that supports cyclic shift reporting for a reference signal in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting cyclic shift reporting for a reference signal). For example, the device 805 or a component of the device 805 may include a processor 840 and memory 830 coupled with the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a network entity, a capability message indicating a capability of the UE to report a cyclic shift for a reference signal. The communications manager 820 may be configured as or otherwise support a means for receiving, from the network entity, an indication of a reporting configuration based on the capability, the reporting configuration indicating uplink resources for reporting the cyclic shift by the UE. The communications manager 820 may be configured as or otherwise support a means for receiving one or more reference signals from the network entity. The communications manager 820 may be configured as or otherwise support a means for transmitting, to the network entity and using the uplink resources, an uplink message indicating the cyclic shift, where the cyclic shift is based on a channel delay spread measurement by the UE of the one or more reference signals.

By including or configuring the communications manager 820 in accordance with examples as described herein, the device 805 may support techniques for reporting a cyclic shift for a reference signal, which may reduce power consumption and improve overall performance as errors due to phase noise may be reduced.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of cyclic shift reporting for a reference signal as described herein, or the processor 840 and the memory 830 may be otherwise configured to perform or support such operations.

Figure 9:
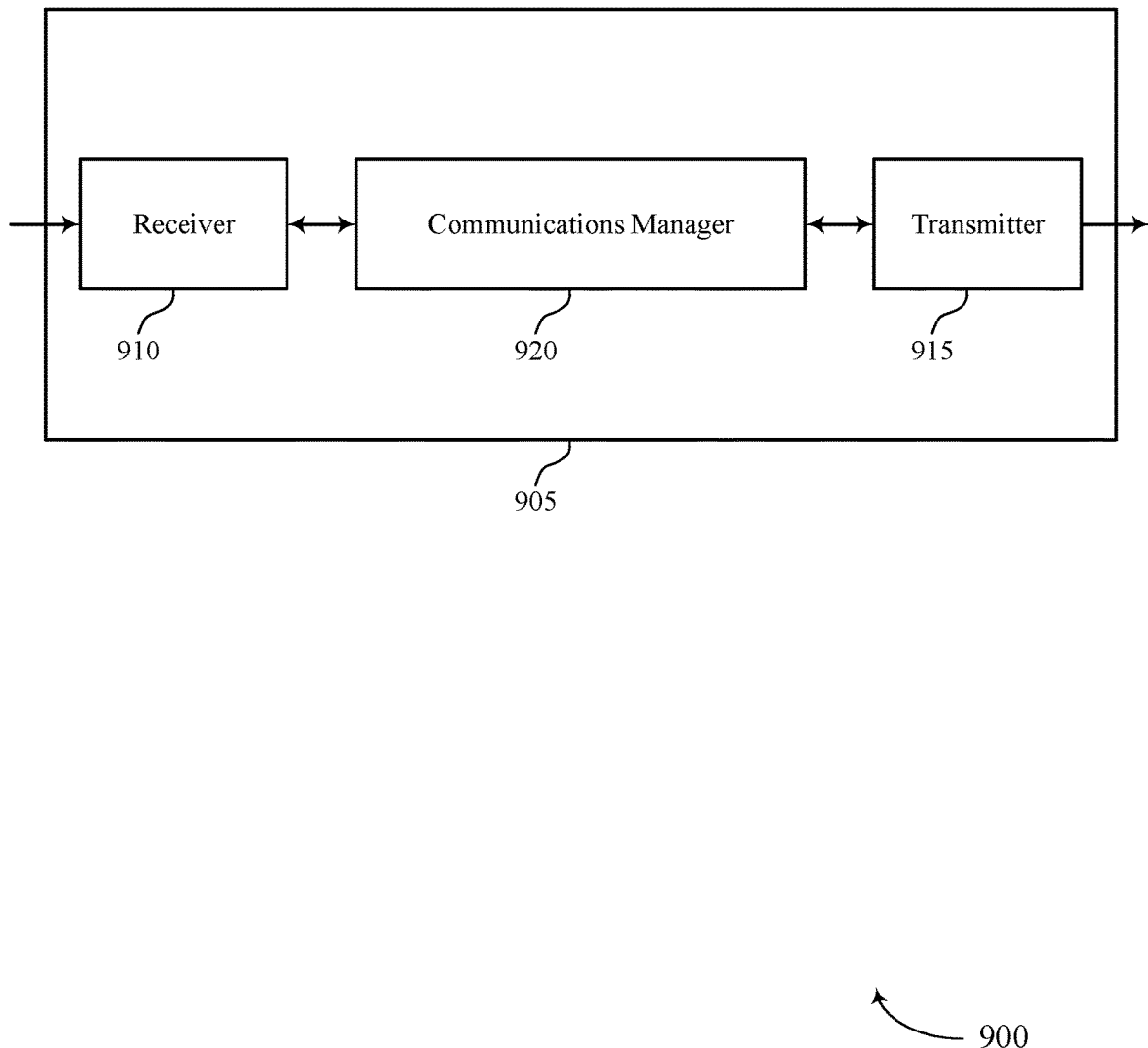
FIGS. 9 and 10 show block diagrams of devices that support cyclic shift reporting for a reference signal in accordance with aspects of the present disclosure.

FIG. 9 shows a block diagram 900 of a device 905 that supports cyclic shift reporting for a reference signal in accordance with aspects of the present disclosure. The device 905 may be an example of aspects of a network entity or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cyclic shift reporting for a reference signal). Information may be passed on to other components of the device 905. The receiver 910 may utilize a single antenna or a set of multiple antennas.

The transmitter 915 may provide a means for transmitting signals generated by other components of the device 905.

For example, the transmitter 915 may transmit information such as packets, user data, control information, or any combination thereof associated with various information channels (e.g., control channels, data channels, information channels related to cyclic shift reporting for a reference signal). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of cyclic shift reporting for a reference signal as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network entity in accordance with examples as disclosed herein. For example, the communications manager 920 may be configured as or otherwise support a means for receiving, from a UE, a capability message indicating a capability of the UE to report a cyclic shift for a reference signal. The communications manager 920 may be configured as or otherwise support a means for transmitting, to the UE, an indication of a reporting configuration based on the capability, the reporting configuration indicating uplink resources for reporting the cyclic shift by the UE. The communications manager 920 may be configured as or otherwise support a means for transmitting one or more reference signals to the UE. The communications manager 920 may be configured as or otherwise support a means for receiving, from the UE and using the uplink resources, an uplink message indicating the cyclic shift, where the cyclic shift is based on a channel delay spread measurement by the UE of the one or more reference signals.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reporting a cyclic shift for a reference signal, which may reduce power consumption and improve overall performance as errors due to phase noise may be reduced.

Figure 10:
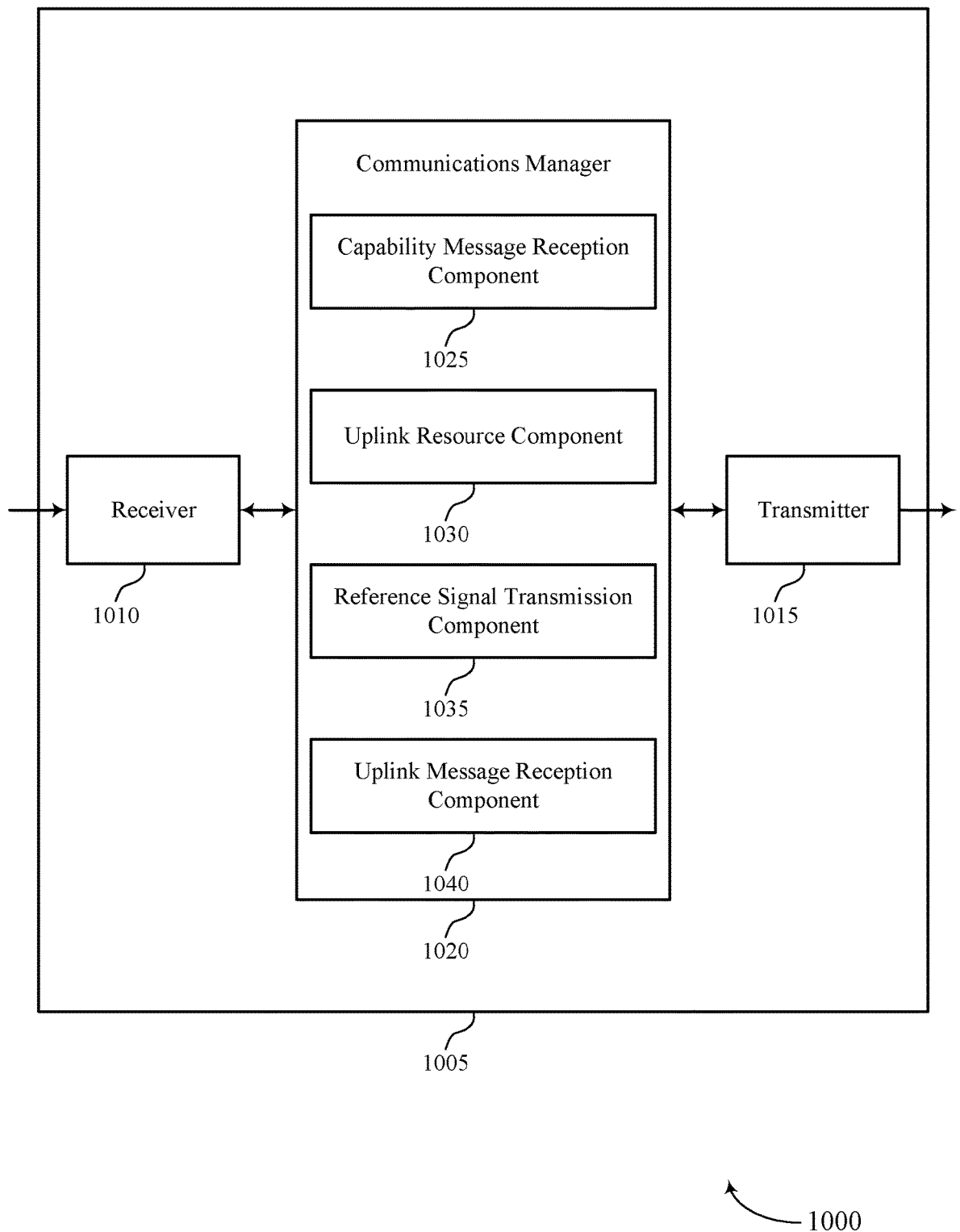

FIG. 10 shows a block diagram 1000 of a device 1005 that supports cyclic shift reporting for a reference signal in accordance with aspects of the present disclosure. The device 1005 may be an example of aspects of a device 905, a network entity, or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to cyclic shift reporting for a reference signal). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to cyclic shift reporting for a reference signal). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of cyclic shift reporting for a reference signal as described herein. For example, the communications manager 1020 may include a capability message reception component 1025, an uplink resource component 1030, a reference signal transmission component 1035, an uplink message reception component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network entity in accordance with examples as disclosed herein. The capability message reception component 1025 may be configured as or otherwise support a means for receiving, from a UE, a capability message indicating a capability of the UE to report a cyclic shift for a reference signal. The uplink resource component 1030 may be configured as or otherwise support a means for transmitting, to the UE, an indication of a reporting configuration based on the capability, the reporting configuration indicating uplink resources for reporting the cyclic shift by the UE. The reference signal transmission component 1035 may be configured as or otherwise support a means for transmitting one or more reference signals to the UE. The uplink message reception component 1040 may be configured as or otherwise support a means for receiving, from the UE and using the uplink resources, an uplink message indicating the cyclic shift, where the cyclic shift is based on a channel delay spread measurement by the UE of the one or more reference signals.

Figure 11:
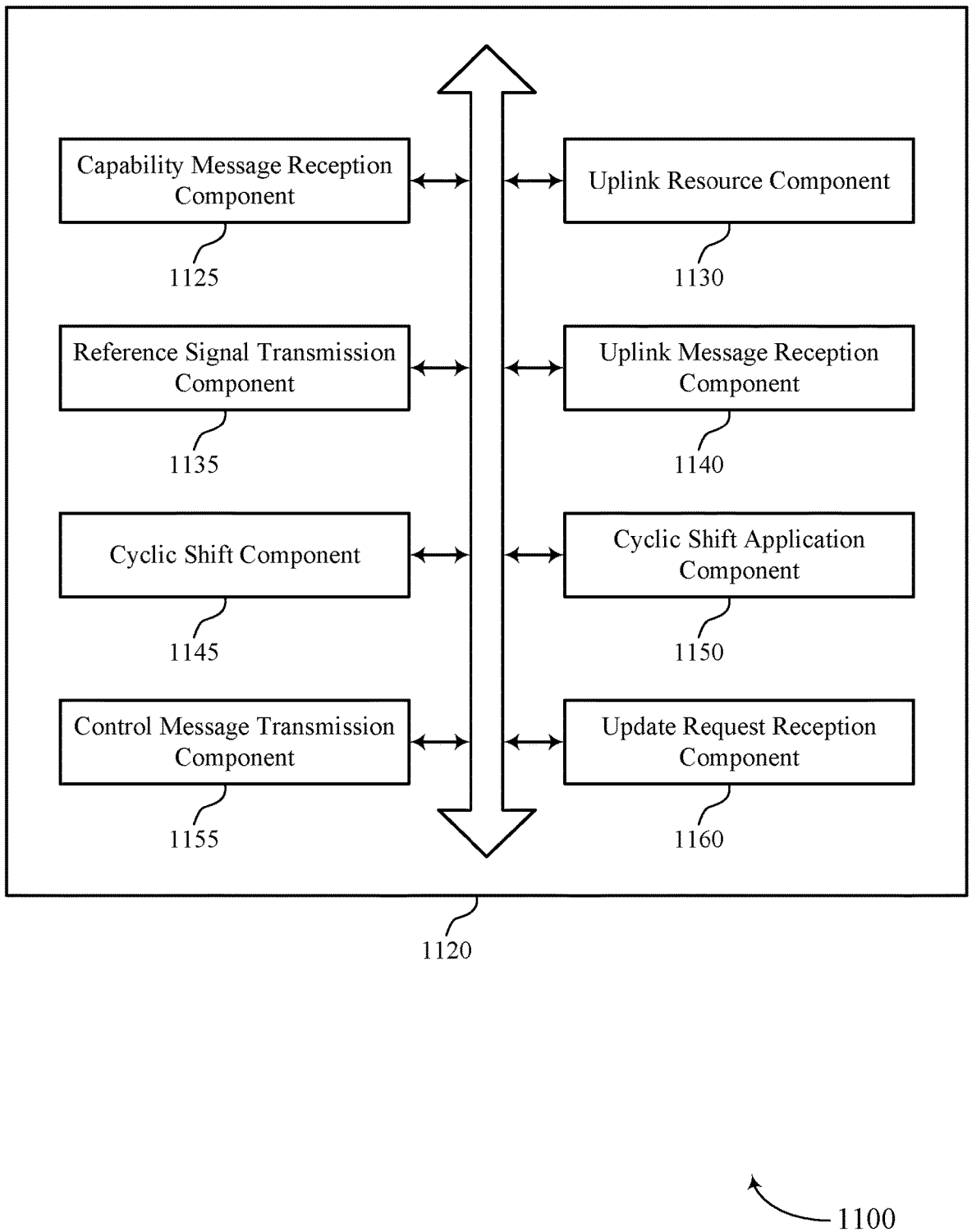
FIG. 11 shows a block diagram of a communications manager that supports cyclic shift reporting for a reference signal in accordance with aspects of the present disclosure.

FIG. 11 shows a block diagram 1100 of a communications manager 1120 that supports cyclic shift reporting for a reference signal in accordance with aspects of the present disclosure. The communications manager 1120 may be an example of aspects of a communications manager 920, a communications manager 1020, or both, as described herein. The communications manager 1120, or various components thereof, may be an example of means for performing various aspects of cyclic shift reporting for a reference signal as described herein. For example, the communications manager 1120 may include a capability message reception component 1125, an uplink resource component 1130, a reference signal transmission component 1135, an uplink message reception component 1140, a cyclic shift component 1145, a cyclic shift application component 1150, a control message transmission component 1155, an update request reception component 1160, or any combination thereof. Each of these components may communicate, directly or indirectly, with one another (e.g., via one or more buses).

The communications manager 1120 may support wireless communications at a network entity in accordance with examples as disclosed herein. The capability message reception component 1125 may be configured as or otherwise support a means for receiving, from a UE, a capability message indicating a capability of the UE to report a cyclic shift for a reference signal. The uplink resource component 1130 may be configured as or otherwise support a means for transmitting, to the UE, an indication of a reporting configuration based on the capability, the reporting configuration indicating uplink resources for reporting the cyclic shift by the UE. The reference signal transmission component 1135 may be configured as or otherwise support a means for transmitting one or more reference signals to the UE. The uplink message reception component 1140 may be configured as or otherwise support a means for receiving, from the UE and using the uplink resources, an uplink message indicating the cyclic shift, where the cyclic shift is based on a channel delay spread measurement by the UE of the one or more reference signals.

In some examples, to support receiving the uplink message indicating the cyclic shift, the cyclic shift component 1145 may be configured as or otherwise support a means for receiving the uplink message indicating a number of samples of the cyclic shift, a direction of the cyclic shift, or both. In some examples, the uplink message includes a shared channel message including a quantity of bits indicating the number of samples of the cyclic shift, the direction of the cyclic shift, or both.

In some examples, to support receiving the uplink message indicating the cyclic shift, the cyclic shift component 1145 may be configured as or otherwise support a means for transmitting the uplink message indicating the cyclic shift a number of reference signal groups for location squeezing based on a phase noise associated with the one or more reference signals.

In some examples, the cyclic shift application component 1150 may be configured as or otherwise support a means for applying the cyclic shift to the one or more reference signals. In some examples, the control message transmission component 1155 may be configured as or otherwise support a means for transmitting, to the UE, a control message indicating that the network entity applied the cyclic shift indicated by the uplink message.

In some examples, the control message transmission component 1155 may be configured as or otherwise support a means for transmitting, to the UE, a control message indicating that the network entity applied a cyclic shift different from the cyclic shift indicated by the uplink message.

In some examples, the update request reception component 1160 may be configured as or otherwise support a means for receiving, from the UE, a request for the network entity to update the applied cyclic shift based on the applied cyclic shift being different from the cyclic shift indicated in the uplink message.

In some examples, to support receiving the uplink message indicating the cyclic shift, the uplink message reception component 1140 may be configured as or otherwise support a means for receiving the uplink message indicating the cyclic shift according to a periodicity based on the reporting configuration.

In some examples, to support receiving the uplink message indicating the cyclic shift, the uplink message reception component 1140 may be configured as or otherwise support a means for receiving the uplink message indicating the cyclic shift aperiodically based on the reporting configuration.

In some examples, to support receiving the uplink message indicating the cyclic shift, the uplink message reception component 1140 may be configured as or otherwise support a means for receiving the uplink message indicating the cyclic shift via a shared channel, a control channel, CSI, or any combination thereof.

In some examples, to support receiving the capability message, the capability message reception component 1125 may be configured as or otherwise support a means for receiving, from the UE, an RRC message indicating the capability of the UE to report the cyclic shift for the reference signal. In some examples, the one or more reference signals includes a time-domain PTRS, a DMRS, a CSI-RS, or any combination thereof.

Figure 12:
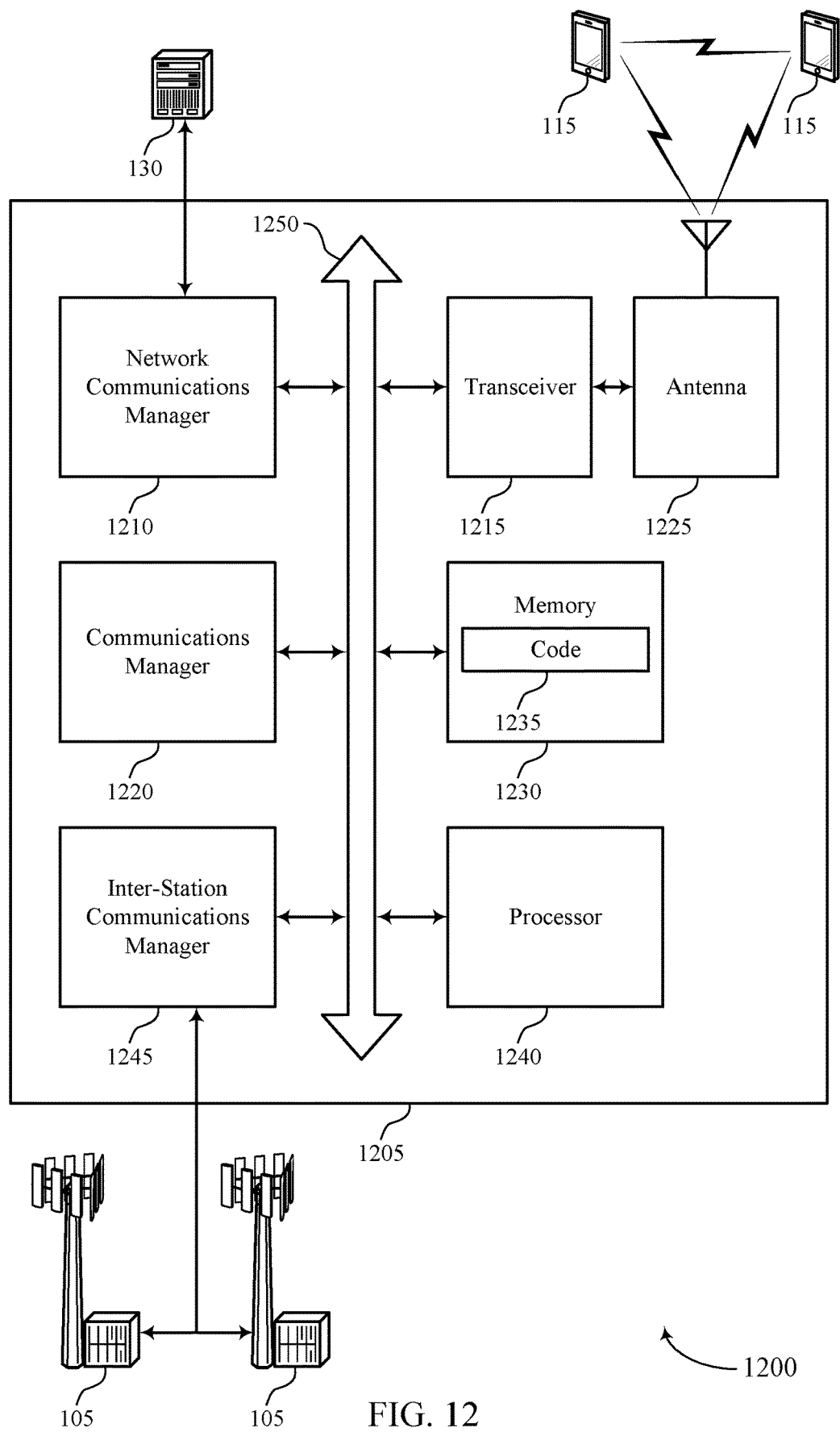
FIG. 12 shows a diagram of a system including a device that supports cyclic shift reporting for a reference signal in accordance with aspects of the present disclosure.

FIG. 12 shows a diagram of a system 1200 including a device 1205 that supports cyclic shift reporting for a reference signal in accordance with aspects of the present disclosure. The device 1205 may be an example of or include the components of a device 905, a device 1005, a network entity, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting cyclic shift reporting for a reference signal). For example, the device 1205 or a component of the device 1205 may include a processor 1240 and memory 1230 coupled with the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a network entity in accordance with examples as disclosed herein. For example, the communications manager 1220 may be configured as or otherwise support a means for receiving, from a UE, a capability message indicating a capability of the UE to report a cyclic shift for a reference signal. The communications manager 1220 may be configured as or otherwise support a means for transmitting, to the UE, an indication of a reporting configuration based on the capability, the reporting configuration indicating uplink resources for reporting the cyclic shift by the UE. The communications manager 1220 may be configured as or otherwise support a means for transmitting one or more reference signals to the UE. The communications manager 1220 may be configured as or otherwise support a means for receiving, from the UE and using the uplink resources, an uplink message indicating the cyclic shift, where the cyclic shift is based on a channel delay spread measurement by the UE of the one or more reference signals.

By including or configuring the communications manager 1220 in accordance with examples as described herein, the device 1205 may support techniques for reporting a cyclic shift for a reference signal, which may reduce power consumption and improve overall performance as errors due to phase noise may be reduced.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of cyclic shift reporting for a reference signal as described herein, or the processor 1240 and the memory 1230 may be otherwise configured to perform or support such operations.

Figure 13:
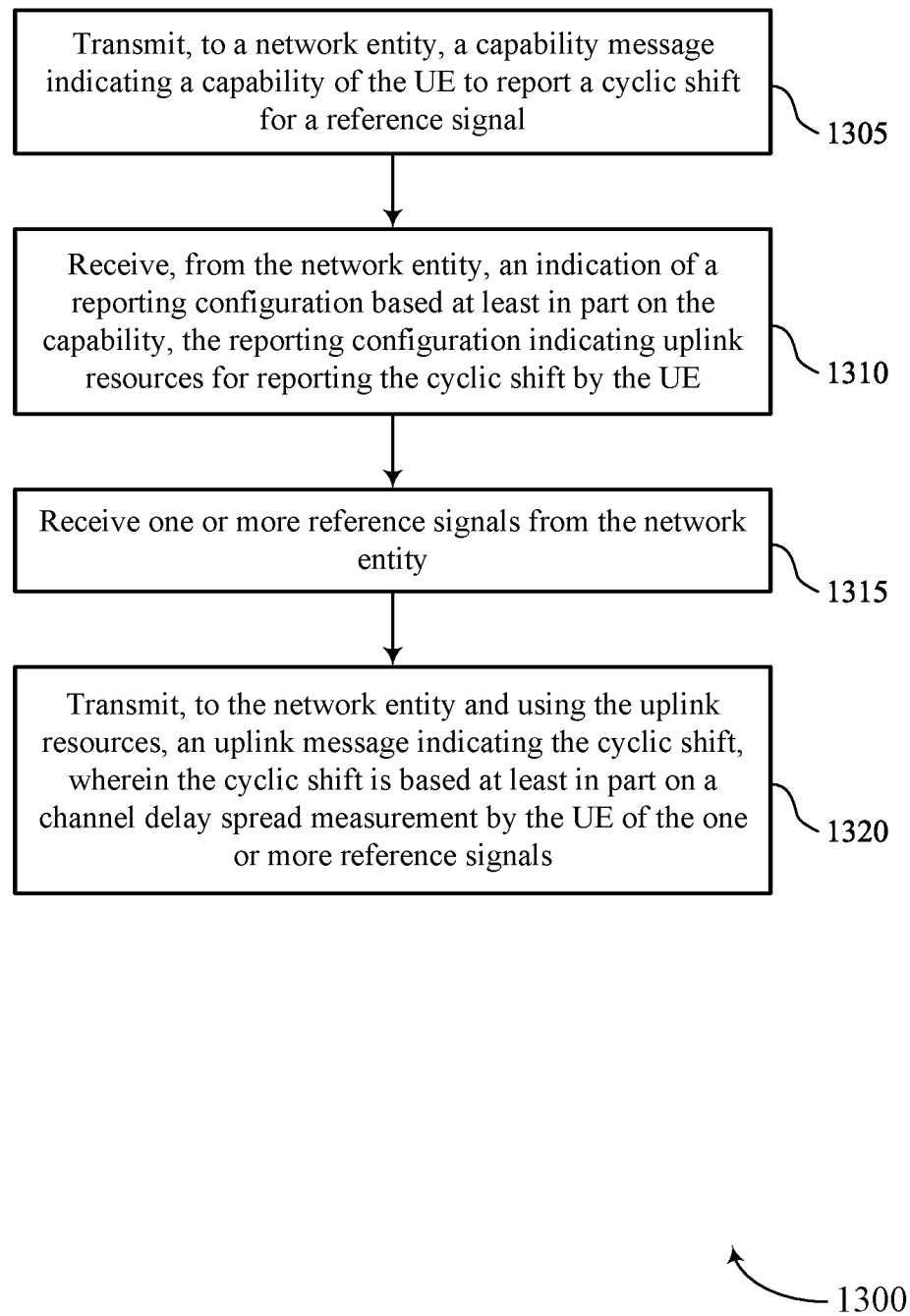
FIGS. 13 through 18 show flowcharts illustrating methods that support cyclic shift reporting for a reference signal in accordance with aspects of the present disclosure.

FIG. 13 shows a flowchart illustrating a method 1300 that supports cyclic shift reporting for a reference signal in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a network entity, a capability message indicating a capability of the UE to report a cyclic shift for a reference signal. The operations of 1305 may be performed in accordance with examples as disclosed herein. In some examples, aspects of the operations of 1305 may be performed by a capability message transmission component 725 as described with reference to FIG. 7.

At 1310, the method may include receiving, from the network entity, an indication of a reporting configuration based on the capability, the reporting configuration indicating uplink resources for reporting the cyclic shift by the UE. The operations of 1310 may be performed in accordance with examples as disclosed herein. In some examples, aspects of the operations of 1310 may be performed by a reporting configuration component 730 as described with reference to FIG. 7.

At 1315, the method may include receiving one or more reference signals from the network entity. The operations of 1315 may be performed in accordance with examples as disclosed herein. In some examples, aspects of the operations of 1315 may be performed by a reference signal reception component 735 as described with reference to FIG. 7.

At 1320, the method may include transmitting, to the network entity and using the uplink resources, an uplink message indicating the cyclic shift, where the cyclic shift is based on a channel delay spread measurement by the UE of the one or more reference signals. The operations of 1320 may be performed in accordance with examples as disclosed herein. In some examples, aspects of the operations of 1320 may be performed by an uplink message transmission component 740 as described with reference to FIG. 7.

Figure 14:
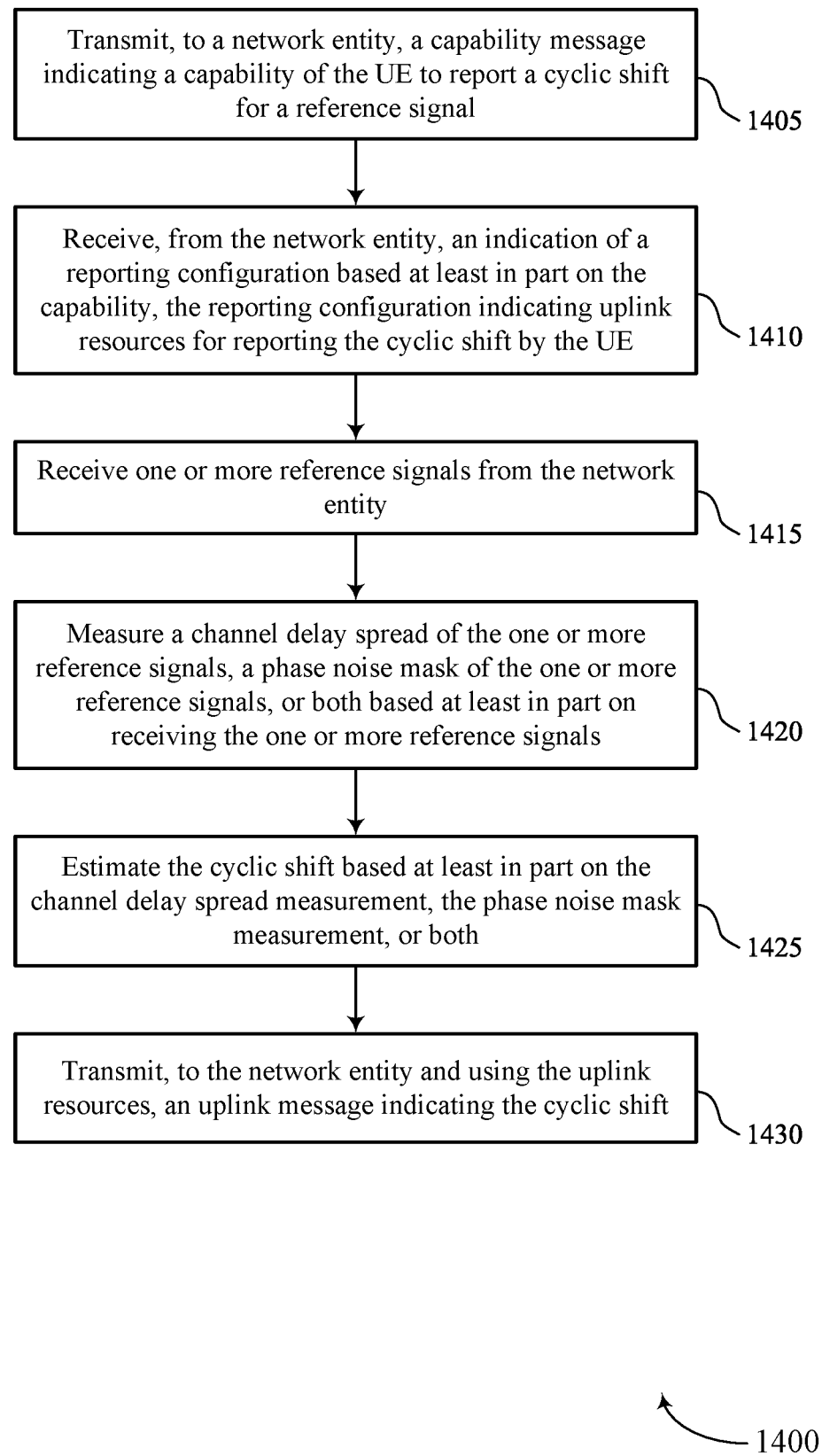

FIG. 14 shows a flowchart illustrating a method 1400 that supports cyclic shift reporting for a reference signal in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a network entity, a capability message indicating a capability of the UE to report a cyclic shift for a reference signal. The operations of 1405 may be performed in accordance with examples as disclosed herein. In some examples, aspects of the operations of 1405 may be performed by a capability message transmission component 725 as described with reference to FIG. 7.

At 1410, the method may include receiving, from the network entity, an indication of a reporting configuration based on the capability, the reporting configuration indicating uplink resources for reporting the cyclic shift by the UE. The operations of 1410 may be performed in accordance with examples as disclosed herein. In some examples, aspects of the operations of 1410 may be performed by a reporting configuration component 730 as described with reference to FIG. 7.

At 1415, the method may include receiving one or more reference signals from the network entity. The operations of 1415 may be performed in accordance with examples as disclosed herein. In some examples, aspects of the operations of 1415 may be performed by a reference signal reception component 735 as described with reference to FIG. 7.

At 1420, the method may include measuring a channel delay spread of the one or more reference signals, a phase noise mask of the one or more reference signals, or both based on receiving the one or more reference signals. The operations of 1420 may be performed in accordance with examples as disclosed herein. In some examples, aspects of the operations of 1420 may be performed by a measurement component 745 as described with reference to FIG. 7.

At 1425, the method may include estimating the cyclic shift based on the channel delay spread measurement, the phase noise mask measurement, or both. The operations of 1425 may be performed in accordance with examples as disclosed herein. In some examples, aspects of the operations of 1425 may be performed by a cyclic shift estimation component 750 as described with reference to FIG. 7.

At 1430, the method may include transmitting, to the network entity and using the uplink resources, an uplink message indicating the cyclic shift. The operations of 1430 may be performed in accordance with examples as disclosed herein. In some examples, aspects of the operations of 1430 may be performed by an uplink message transmission component 740 as described with reference to FIG. 7.

Figure 15:
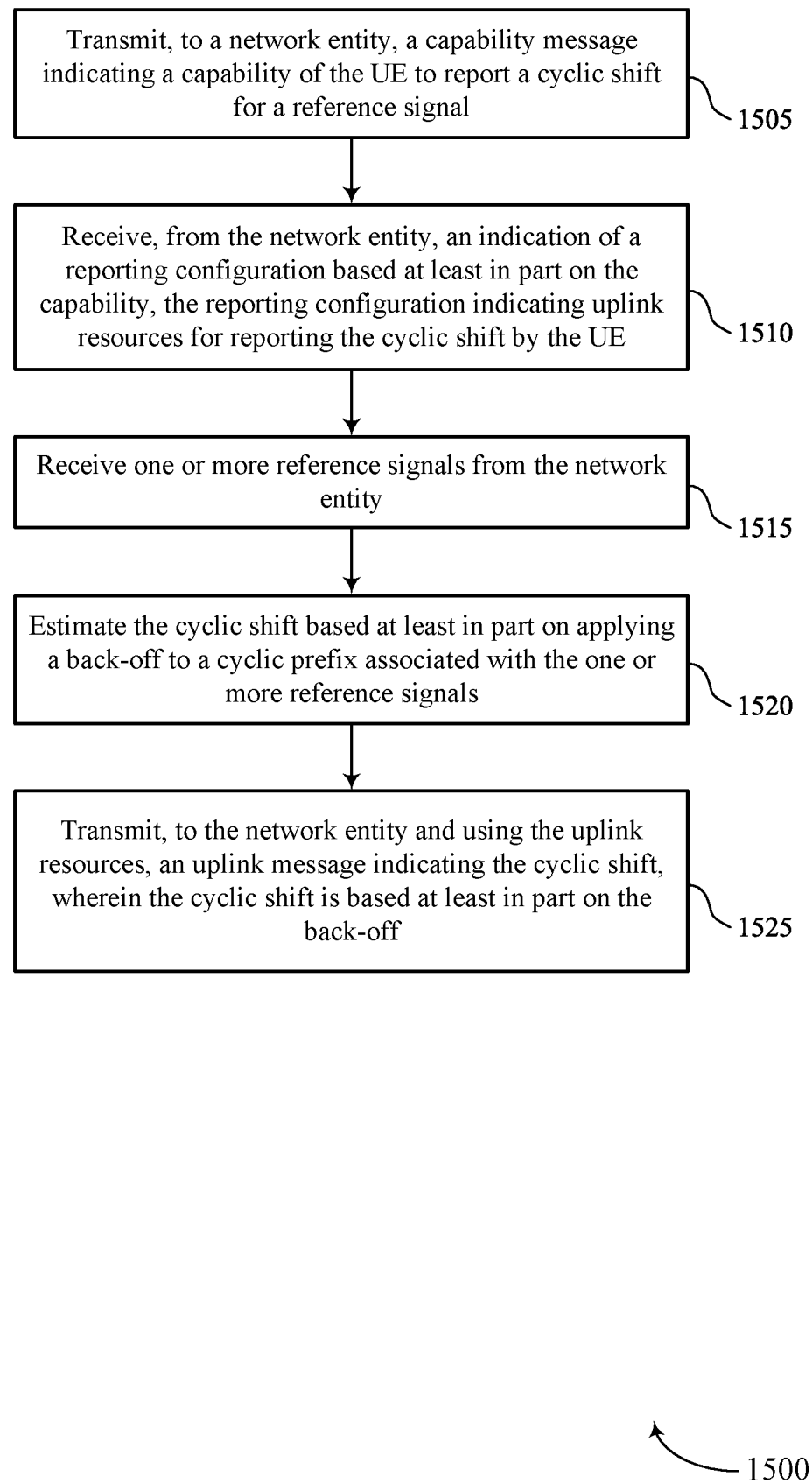

FIG. 15 shows a flowchart illustrating a method 1500 that supports cyclic shift reporting for a reference signal in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a network entity, a capability message indicating a capability of the UE to report a cyclic shift for a reference signal. The operations of 1505 may be performed in accordance with examples as disclosed herein. In some examples, aspects of the operations of 1505 may be performed by a capability message transmission component 725 as described with reference to FIG. 7.

At 1510, the method may include receiving, from the network entity, an indication of a reporting configuration based on the capability, the reporting configuration indicating uplink resources for reporting the cyclic shift by the UE. The operations of 1510 may be performed in accordance with examples as disclosed herein. In some examples, aspects of the operations of 1510 may be performed by a reporting configuration component 730 as described with reference to FIG. 7.

At 1515, the method may include receiving one or more reference signals from the network entity. The operations of 1515 may be performed in accordance with examples as disclosed herein. In some examples, aspects of the operations of 1515 may be performed by a reference signal reception component 735 as described with reference to FIG. 7.

At 1520, the method may include estimating the cyclic shift based on applying a back-off to a cyclic prefix associated with the one or more reference signals. The operations of 1520 may be performed in accordance with examples as disclosed herein. In some examples, aspects of the operations of 1520 may be performed by a cyclic shift estimation component 750 as described with reference to FIG. 7.

At 1525, the method may include transmitting, to the network entity and using the uplink resources, an uplink message indicating the cyclic shift, where the cyclic shift is based on the back-off. The operations of 1525 may be performed in accordance with examples as disclosed herein. In some examples, aspects of the operations of 1525 may be performed by an uplink message transmission component 740 as described with reference to FIG. 7.

Figure 16:
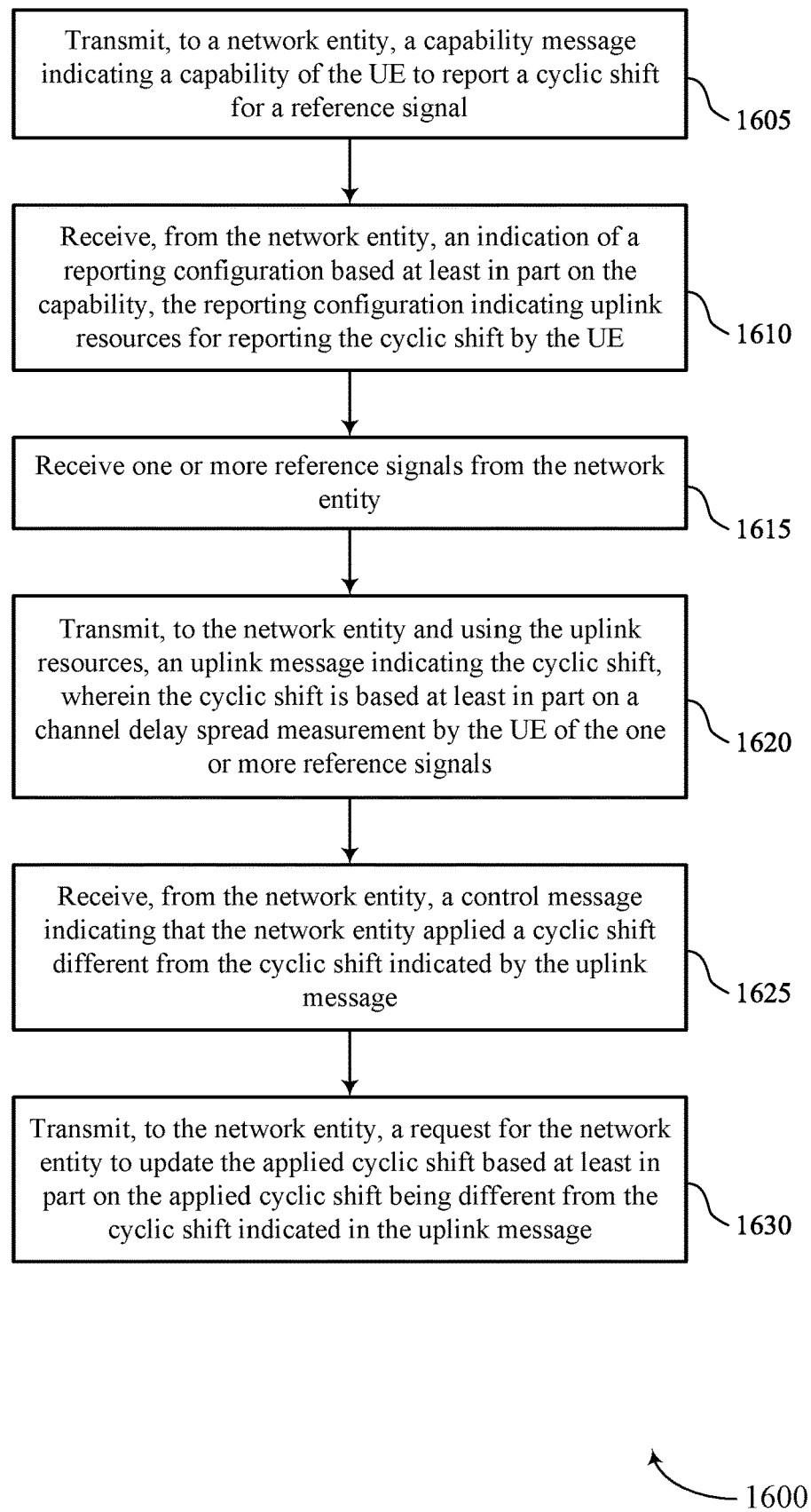

FIG. 16 shows a flowchart illustrating a method 1600 that supports cyclic shift reporting for a reference signal in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, to a network entity, a capability message indicating a capability of the UE to report a cyclic shift for a reference signal. The operations of 1605 may be performed in accordance with examples as disclosed herein. In some examples, aspects of the operations of 1605 may be performed by a capability message transmission component 725 as described with reference to FIG. 7.

At 1610, the method may include receiving, from the network entity, an indication of a reporting configuration based on the capability, the reporting configuration indicating uplink resources for reporting the cyclic shift by the UE. The operations of 1610 may be performed in accordance with examples as disclosed herein. In some examples, aspects of the operations of 1610 may be performed by a reporting configuration component 730 as described with reference to FIG. 7.

At 1615, the method may include receiving one or more reference signals from the network entity. The operations of 1615 may be performed in accordance with examples as disclosed herein. In some examples, aspects of the operations of 1615 may be performed by a reference signal reception component 735 as described with reference to FIG. 7.

At 1620, the method may include transmitting, to the network entity and using the uplink resources, an uplink message indicating the cyclic shift, where the cyclic shift is based on a channel delay spread measurement by the UE of the one or more reference signals. The operations of 1620 may be performed in accordance with examples as disclosed herein. In some examples, aspects of the operations of 1620 may be performed by an uplink message transmission component 740 as described with reference to FIG. 7.

At 1625, the method may include receiving, from the network entity, a control message indicating that the network entity applied a cyclic shift different from the cyclic shift indicated by the uplink message. The operations of 1625 may be performed in accordance with examples as disclosed herein. In some examples, aspects of the operations of 1625 may be performed by a control message reception component 755 as described with reference to FIG. 7.

At 1630, the method may include transmitting, to the network entity, a request for the network entity to update the applied cyclic shift based on the applied cyclic shift being different from the cyclic shift indicated in the uplink message. The operations of 1630 may be performed in accordance with examples as disclosed herein. In some examples, aspects of the operations of 1630 may be performed by an update request transmission component 760 as described with reference to FIG. 7.

Figure 17:
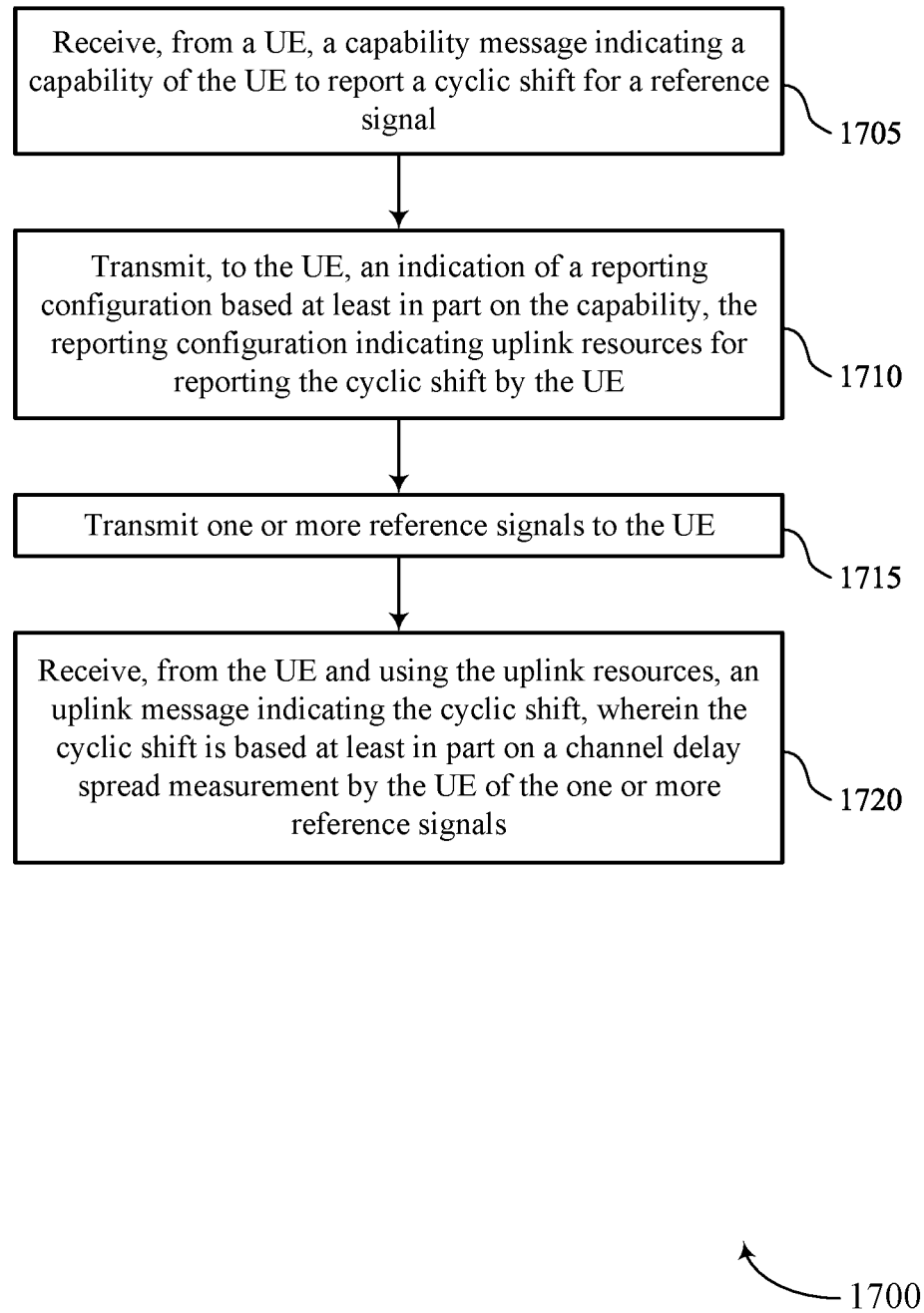

FIG. 17 shows a flowchart illustrating a method 1700 that supports cyclic shift reporting for a reference signal in accordance with aspects of the present disclosure. The operations of the method 1700 may be implemented by a network entity or its components as described herein. For example, the operations of the method 1700 may be performed by a network entity or a base station 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1705, the method may include receiving, from a UE, a capability message indicating a capability of the UE to report a cyclic shift for a reference signal. The operations of 1705 may be performed in accordance with examples as disclosed herein. In some examples, aspects of the operations of 1705 may be performed by a capability message reception component 1125 as described with reference to FIG. 11.

At 1710, the method may include transmitting, to the UE, an indication of a reporting configuration based on the capability, the reporting configuration indicating uplink resources for reporting the cyclic shift by the UE. The operations of 1710 may be performed in accordance with examples as disclosed herein. In some examples, aspects of the operations of 1710 may be performed by an uplink resource component 1130 as described with reference to FIG. 11.

At 1715, the method may include transmitting one or more reference signals to the UE. The operations of 1715 may be performed in accordance with examples as disclosed herein. In some examples, aspects of the operations of 1715 may be performed by a reference signal transmission component 1135 as described with reference to FIG. 11.

At 1720, the method may include receiving, from the UE and using the uplink resources, an uplink message indicating the cyclic shift, where the cyclic shift is based on a channel delay spread measurement by the UE of the one or more reference signals. The operations of 1720 may be performed in accordance with examples as disclosed herein. In some examples, aspects of the operations of 1720 may be performed by an uplink message reception component 1140 as described with reference to FIG. 11.

Figure 18:
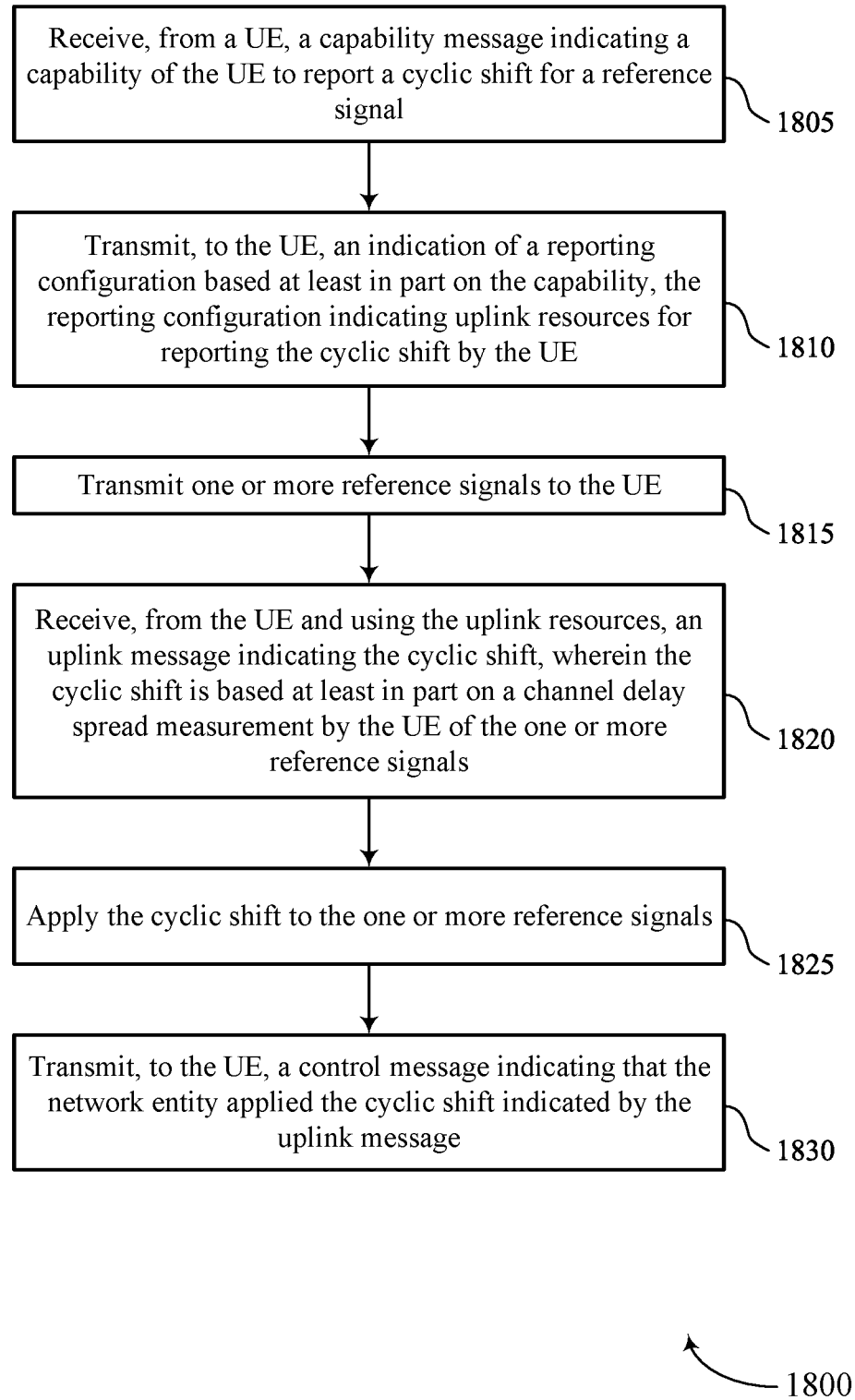

FIG. 18 shows a flowchart illustrating a method 1800 that supports cyclic shift reporting for a reference signal in accordance with aspects of the present disclosure. The operations of the method 1800 may be implemented by a network entity or its components as described herein. For example, the operations of the method 1800 may be performed by a network entity or a base station 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1805, the method may include receiving, from a UE, a capability message indicating a capability of the UE to report a cyclic shift for a reference signal. The operations of 1805 may be performed in accordance with examples as disclosed herein. In some examples, aspects of the operations of 1805 may be performed by a capability message reception component 1125 as described with reference to FIG. 11.

At 1810, the method may include transmitting, to the UE, an indication of a reporting configuration based on the capability, the reporting configuration indicating uplink resources for reporting the cyclic shift by the UE. The operations of 1810 may be performed in accordance with examples as disclosed herein. In some examples, aspects of the operations of 1810 may be performed by an uplink resource component 1130 as described with reference to FIG. 11.

At 1815, the method may include transmitting one or more reference signals to the UE. The operations of 1815 may be performed in accordance with examples as disclosed herein. In some examples, aspects of the operations of 1815 may be performed by a reference signal transmission component 1135 as described with reference to FIG. 11.

At 1820, the method may include receiving, from the UE and using the uplink resources, an uplink message indicating the cyclic shift, where the cyclic shift is based on a channel delay spread measurement by the UE of the one or more reference signals. The operations of 1820 may be performed in accordance with examples as disclosed herein. In some examples, aspects of the operations of 1820 may be performed by an uplink message reception component 1140 as described with reference to FIG. 11.

At 1825, the method may include applying the cyclic shift to the one or more reference signals. The operations of 1825 may be performed in accordance with examples as disclosed herein. In some examples, aspects of the operations of 1825 may be performed by a cyclic shift application component 1150 as described with reference to FIG. 11.

At 1830, the method may include transmitting, to the UE, a control message indicating that the network entity applied the cyclic shift indicated by the uplink message. The operations of 1830 may be performed in accordance with examples as disclosed herein. In some examples, aspects of the operations of 1830 may be performed by a control message transmission component 1155 as described with reference to FIG. 11.

The following provides an overview of aspects of the present disclosure:

Aspect 1: A method for wireless communications at a UE, comprising: transmitting, to a network entity, a capability message indicating a capability of the UE to report a cyclic shift for a reference signal; receiving, from the network entity, an indication of a reporting configuration based at least in part on the capability, the reporting configuration indicating uplink resources for reporting the cyclic shift by the UE; receiving one or more reference signals from the network entity; and transmitting, to the network entity and using the uplink resources, an uplink message indicating the cyclic shift, wherein the cyclic shift is based at least in part on a channel delay spread measurement by the UE of the one or more reference signals.

Aspect 2: The method of aspect 1, further comprising: measuring a channel delay spread of the one or more reference signals, a phase noise mask of the one or more reference signals, or both based at least in part on receiving the one or more reference signals; and estimating the cyclic shift based at least in part on the channel delay spread measurement, the phase noise mask measurement, or both.

Aspect 3: The method of aspect 2, further comprising: estimating the cyclic shift based at least in part on applying a back-off to a cyclic prefix associated with the one or more reference signals.

Aspect 4: The method of any of aspects 1 through 3, wherein transmitting the uplink message indicating the cyclic shift comprises: transmitting the uplink message indicating a number of samples of the cyclic shift, a direction of the cyclic shift, or both.

Aspect 5: The method of aspect 4, wherein the uplink message comprises a shared channel message comprising a quantity of bits indicating the number of samples of the cyclic shift, the direction of the cyclic shift, or both.

Aspect 6: The method of any of aspects 1 through 5, further comprising: receiving, from the network entity, a control message indicating that the network entity applied the cyclic shift indicated by the uplink message.

Aspect 7: The method of any of aspects 1 through 6, further comprising: receiving, from the network entity, a control message indicating that the network entity applied a cyclic shift different from the cyclic shift indicated by the uplink message.

Aspect 8: The method of any of aspects 1 through 7, further comprising: transmitting, to the network entity, a request for the network entity to update the applied cyclic shift based at least in part on the applied cyclic shift being different from the cyclic shift indicated in the uplink message.

Aspect 9: The method of any of aspects 1 through 8, further comprising: selecting the uplink resources for reporting the cyclic shift based at least in part on the capability of the UE to report the cyclic shift for the reference signal.

Aspect 10: The method of any of aspects 1 through 9, wherein transmitting the uplink message indicating the cyclic shift comprises: transmitting the uplink message indicating the cyclic shift according to a periodicity based at least in part on the reporting configuration.

Aspect 11: The method of any of aspects 1 through 10, wherein transmitting the uplink message indicating the cyclic shift comprises: transmitting the uplink message indicating the cyclic shift aperiodically based at least in part on the reporting configuration.

Aspect 12: The method of any of aspects 1 through 11, wherein transmitting the uplink message indicating the cyclic shift comprises: transmitting the uplink message indicating the cyclic shift via a shared channel, a control channel, channel state information, or any combination thereof.

Aspect 13: The method of any of aspects 1 through 12, wherein transmitting the capability message comprises: transmitting, to the network entity, an RRC message indicating the capability of the UE to report the cyclic shift for the reference signal.

Aspect 14: The method of any of aspects 1 through 13, wherein transmitting the uplink message indicating the cyclic shift comprises: transmitting the uplink message indicating the cyclic shift a number of reference signal groups for location squeezing based at least in part on a phase noise associated with the one or more reference signals.

Aspect 15: The method of any of aspects 1 through 14, wherein the one or more reference signals comprises a time-domain PTRS, a DMRS, a CSI-RS, or any combination thereof.

Aspect 16: A method for wireless communications at a network entity, comprising: receiving, from a UE, a capability message indicating a capability of the UE to report a cyclic shift for a reference signal; transmitting, to the UE, an indication of a reporting configuration based at least in part on the capability, the reporting configuration indicating uplink resources for reporting the cyclic shift by the UE; transmitting one or more reference signals to the UE; and receiving, from the UE and using the uplink resources, an uplink message indicating the cyclic shift, wherein the cyclic shift is based at least in part on a channel delay spread measurement by the UE of the one or more reference signals.

Aspect 17: The method of aspect 16, wherein receiving the uplink message indicating the cyclic shift comprises:

receiving the uplink message indicating a number of samples of the cyclic shift, a direction of the cyclic shift, or both.

Aspect 18: The method of aspect 17, wherein the uplink message comprises a shared channel message comprising a quantity of bits indicating the number of samples of the cyclic shift, the direction of the cyclic shift, or both.

Aspect 19: The method of any of aspects 16 through 18, wherein receiving the uplink message indicating the cyclic shift comprises: transmitting the uplink message indicating the cyclic shift a number of reference signal groups for location squeezing based at least in part on a phase noise associated with the one or more reference signals.

Aspect 20: The method of any of aspects 16 through 19, further comprising: applying the cyclic shift to the one or more reference signals; and transmitting, to the UE, a control message indicating that the network entity applied the cyclic shift indicated by the uplink message.

Aspect 21: The method of any of aspects 16 through 20, further comprising: transmitting, to the UE, a control message indicating that the network entity applied a cyclic shift different than the cyclic shift indicated by the uplink message.

Aspect 22: The method of aspect 21, further comprising: receiving, from the UE, a request for the network entity to update the applied cyclic shift based at least in part on the applied cyclic shift being different from the cyclic shift indicated in the uplink message.

Aspect 23: The method of any of aspects 16 through 22, wherein receiving the uplink message indicating the cyclic shift comprises: receiving the uplink message indicating the cyclic shift according to a periodicity based at least in part on the reporting configuration.

Aspect 24: The method of any of aspects 16 through 23, wherein receiving the uplink message indicating the cyclic shift comprises: receiving the uplink message indicating the cyclic shift aperiodically based at least in part on the reporting configuration.

Aspect 25: The method of any of aspects 16 through 24, wherein receiving the uplink message indicating the cyclic shift comprises: receiving the uplink message indicating the cyclic shift via a shared channel, a control channel, channel state information, or any combination thereof.

Aspect 26: The method of any of aspects 16 through 25, wherein receiving the capability message comprises: receiving, from the UE, an RRC message indicating the capability of the UE to report the cyclic shift for the reference signal.

Aspect 27: The method of any of aspects 16 through 26, wherein the one or more reference signals comprises a time-domain PTRS, a DMRS, a CSI-RS, or any combination thereof.

Aspect 28: An apparatus for wireless communications at a UE, comprising a processor; memory coupled with the processor; and one or more instructions stored in the memory. The one or more instructions may be executable by the processor to cause the apparatus to, based on the one or more instructions, perform a method of any of aspects 1 through 15.

Aspect 29: An apparatus for wireless communications at a UE, comprising at least one means for performing a method of any of aspects 1 through 15.

Aspect 30: A non-transitory computer-readable medium storing code for wireless communications at a UE, the code comprising instructions executable by a processor to perform a method of any of aspects 1 through 15.

Aspect 31: An apparatus for wireless communications at a network entity, comprising a processor; memory coupled with the processor; and one or more instructions stored in the memory. The one or more instructions may be executable by the processor to cause the apparatus to, based on the one or more instructions, perform a method of any of aspects 16 through 27.

Aspect 32: An apparatus for wireless communications at a network entity, comprising at least one means for performing a method of any of aspects 16 through 27.

Aspect 33: A non-transitory computer-readable medium storing code for wireless communications at a network entity, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, to a network entity, a capability message indicating a capability of the UE to report a cyclic shift for a reference signal;
   receiving, from the network entity, an indication of a reporting configuration based at least in part on the capability, the reporting configuration indicating uplink resources for reporting the cyclic shift by the UE;
   receiving one or more reference signals from the network entity; and
   transmitting, to the network entity and using the uplink resources, an uplink message indicating the cyclic shift, wherein the cyclic shift is based at least in part on a channel delay spread measurement by the UE of the one or more reference signals.

2. The method of claim 1, further comprising:
   measuring a channel delay spread of the one or more reference signals, a phase noise mask of the one or more reference signals, or both based at least in part on receiving the one or more reference signals; and
   estimating the cyclic shift based at least in part on the channel delay spread measurement, the phase noise mask measurement, or both.

3. The method of claim 2, further comprising:
   estimating the cyclic shift based at least in part on applying a back-off to a cyclic prefix associated with the one or more reference signals.

4. The method of claim 1, wherein transmitting the uplink message indicating the cyclic shift comprises:
   transmitting the uplink message indicating a number of samples of the cyclic shift, a direction of the cyclic shift, or both.

5. The method of claim 4, wherein the uplink message comprises a shared channel message comprising a quantity of bits indicating the number of samples of the cyclic shift, the direction of the cyclic shift, or both.

6. The method of claim 1, further comprising:
   receiving, from the network entity, a control message indicating that the network entity applied the cyclic shift indicated by the uplink message.

7. The method of claim 1, further comprising:
   receiving, from the network entity, a control message indicating that the network entity applied a cyclic shift different from the cyclic shift indicated by the uplink message.

8. The method of claim 1, further comprising:
transmitting, to the network entity, a request for the network entity to update the applied cyclic shift based at least in part on the applied cyclic shift being different from the cyclic shift indicated in the uplink message.

9. The method of claim 1, further comprising:
selecting the uplink resources for reporting the cyclic shift based at least in part on the capability of the UE to report the cyclic shift for the reference signal.

10. The method of claim 1, wherein transmitting the uplink message indicating the cyclic shift comprises:
transmitting the uplink message indicating the cyclic shift according to a periodicity based at least in part on the reporting configuration.

11. The method of claim 1, wherein transmitting the uplink message indicating the cyclic shift comprises:
transmitting the uplink message indicating the cyclic shift aperiodically based at least in part on the reporting configuration.

12. The method of claim 1, wherein transmitting the uplink message indicating the cyclic shift comprises:
transmitting the uplink message indicating the cyclic shift via a shared channel, a control channel, channel state information, or any combination thereof.

13. The method of claim 1, wherein transmitting the capability message comprises:
transmitting, to the network entity, a radio resource control message indicating the capability of the UE to report the cyclic shift for the reference signal.

14. The method of claim 1, wherein transmitting the uplink message indicating the cyclic shift comprises:
transmitting the uplink message indicating the cyclic shift a number of reference signal groups for location squeezing based at least in part on a phase noise associated with the one or more reference signals.

15. The method of claim 1, wherein the one or more reference signals comprises a time-domain phase tracking reference signal, a demodulation reference signal, a channel state information reference signal, or any combination thereof.

16. A method for wireless communications at a network entity, comprising:
receiving, from a user equipment (UE), a capability message indicating a capability of the UE to report a cyclic shift for a reference signal;
transmitting, to the UE, an indication of a reporting configuration based at least in part on the capability, the reporting configuration indicating uplink resources for reporting the cyclic shift by the UE;
transmitting one or more reference signals to the UE; and
receiving, from the UE and using the uplink resources, an uplink message indicating the cyclic shift, wherein the cyclic shift is based at least in part on a channel delay spread measurement by the UE of the one or more reference signals.

17. The method of claim 16, wherein receiving the uplink message indicating the cyclic shift comprises:
receiving the uplink message indicating a number of samples of the cyclic shift, a direction of the cyclic shift, or both.

18. The method of claim 17, wherein the uplink message comprises a shared channel message comprising a quantity of bits indicating the number of samples of the cyclic shift, the direction of the cyclic shift, or both.

19. The method of claim 16, wherein receiving the uplink message indicating the cyclic shift comprises:
transmitting the uplink message indicating the cyclic shift a number of reference signal groups for location squeezing based at least in part on a phase noise associated with the one or more reference signals.

20. The method of claim 16, further comprising:
applying the cyclic shift to the one or more reference signals; and
transmitting, to the UE, a control message indicating that the network entity applied the cyclic shift indicated by the uplink message.

21. The method of claim 16, further comprising:
transmitting, to the UE, a control message indicating that the network entity applied a cyclic shift different from the cyclic shift indicated by the uplink message.

22. The method of claim 21, further comprising:
receiving, from the UE, a request for the network entity to update the applied cyclic shift based at least in part on the applied cyclic shift being different from the cyclic shift indicated in the uplink message.

23. The method of claim 16, wherein receiving the uplink message indicating the cyclic shift comprises:
receiving the uplink message indicating the cyclic shift according to a periodicity based at least in part on the reporting configuration.

24. The method of claim 16, wherein receiving the uplink message indicating the cyclic shift comprises:
receiving the uplink message indicating the cyclic shift aperiodically based at least in part on the reporting configuration.

25. The method of claim 16, wherein receiving the uplink message indicating the cyclic shift comprises:
receiving the uplink message indicating the cyclic shift via a shared channel, a control channel, channel state information, or any combination thereof.

26. The method of claim 16, wherein receiving the capability message comprises:
receiving, from the UE, a radio resource control message indicating the capability of the UE to report the cyclic shift for the reference signal.

27. The method of claim 16, wherein the one or more reference signals comprises a time-domain phase tracking reference signal, a demodulation reference signal, a channel state information reference signal, or any combination thereof.

28. An apparatus for wireless communications at a user equipment (UE), comprising:
a processor;
memory coupled with the processor; and
one or more instructions stored in the memory and executable by the processor to cause the apparatus to, based at least in part on the one or more instructions:
transmit, to a network entity, a capability message indicating a capability of the UE to report a cyclic shift for a reference signal;
receive, from the network entity, an indication of a reporting configuration based at least in part on the capability, the reporting configuration indicating uplink resources for reporting the cyclic shift by the UE;
receive one or more reference signals from the network entity; and
transmit, to the network entity and using the uplink resources, an uplink message indicating the cyclic shift, wherein the cyclic shift is based at least in part on a channel delay spread measurement by the UE of the one or more reference signals.

29. The apparatus of claim 28, wherein the instructions are further executable by the processor to cause the apparatus to:
   measure a channel delay spread of the one or more reference signals, a phase noise mask of the one or more reference signals, or both based at least in part on receiving the one or more reference signals; and
   estimate the cyclic shift based at least in part on the channel delay spread measurement, the phase noise mask measurement, or both.

30. An apparatus for wireless communications at a network entity, comprising:
   a processor;
   memory coupled with the processor; and
   one or more instructions stored in the memory and executable by the processor to cause the apparatus to, based at least in part on the one or more instructions:
      receive, from a user equipment (UE), a capability message indicating a capability of the UE to report a cyclic shift for a reference signal;
      transmit, to the UE, an indication of a reporting configuration based at least in part on the capability, the reporting configuration indicating uplink resources for reporting the cyclic shift by the UE;
      transmit one or more reference signals to the UE; and
      receive, from the UE and using the uplink resources, an uplink message indicating the cyclic shift, wherein the cyclic shift is based at least in part on a channel delay spread measurement by the UE of the one or more reference signals.

* * * * *